(12) United States Patent
Hedloy

(10) Patent No.: US 7,272,604 B1
(45) Date of Patent: *Sep. 18, 2007

(54) METHOD, SYSTEM AND COMPUTER READABLE MEDIUM FOR ADDRESSING HANDLING FROM AN OPERATING SYSTEM

(76) Inventor: Atle Hedloy, Terrasseveien 12, 1320 Stabekk (NO)

( * ) Notice: Subject to any disclaimer, the term of this patent is extended or adjusted under 35 U.S.C. 154(b) by 0 days.

This patent is subject to a terminal disclaimer.

(21) Appl. No.: 09/390,303

(22) Filed: Sep. 3, 1999

(51) Int. Cl.
*G06F 17/30* (2006.01)
*G06F 7/00* (2006.01)

(52) U.S. Cl. .................. 707/10; 707/102; 707/203

(58) Field of Classification Search ............. 707/1–5, 707/10, 101, 103 R, 104.1, 201, 204, 203, 707/219, 202, 505, 511, 503, 501.1, 531, 707/102, 200; 709/203, 202, 238, 316; 369/30.06; 715/501.1, 511, 531

See application file for complete search history.

(56) References Cited

U.S. PATENT DOCUMENTS

| | | | |
|---|---|---|---|
| 4,674,065 A | 6/1987 | Lange et al. | 382/311 |
| 5,226,117 A | 7/1993 | Miklos | 345/853 |
| 5,331,555 A | 7/1994 | Hashimoto et al. | 707/531 |
| 5,392,386 A | 2/1995 | Chalas | 345/841 |
| 5,416,901 A | 5/1995 | Torres | 345/835 |
| 5,491,783 A | 2/1996 | Douglas et al. | 345/846 |
| 5,491,784 A | 2/1996 | Douglas et al. | 345/810 |
| 5,500,859 A | 3/1996 | Sharma et al. | 370/468 |
| 5,530,853 A | 6/1996 | Schell et al. | 707/1 |
| 5,546,447 A | 8/1996 | Skarbo et al. | 379/142.05 |
| 5,576,955 A | 11/1996 | Newbold et al. | 715/533 |
| 5,606,712 A | 2/1997 | Hidaka | 712/1 |
| 5,640,565 A | 6/1997 | Dickinson | 707/103 R |
| 5,666,502 A | 9/1997 | Capps | 345/811 |
| 5,708,804 A | 1/1998 | Goodwin et al. | 707/3 |
| 5,724,597 A | 3/1998 | Cuthbertson et al. | 715/531 |
| 5,732,229 A * | 3/1998 | Dickinson | 345/764 |

(Continued)

FOREIGN PATENT DOCUMENTS

EP    0 093 250 A2    11/1983

(Continued)

OTHER PUBLICATIONS

User Manual For AddressMate and AddressMate Plus 1994-1995 by AddressMate Software.

(Continued)

*Primary Examiner*—Jeffrey Gaffin
*Assistant Examiner*—Jacques Veillard
(74) *Attorney, Agent, or Firm*—Cesari and McKenna, LLP

(57) ABSTRACT

A method, system and computer readable medium for information handling within an operating system, including providing a record retrieval program; providing an input device within a window or screen of the operating system and configured to enter an execute command which initiates a record retrieval from local and remote information sources using the record retrieval program; using the record retrieval program to enter first information into search fields provided in the record retrieval program; entering the execute command using the input device after the step of entering the first information; searching, using the record retrieval program, the local and remote information sources for second information associated with the first information; and displaying the second information in the record retrieval program, when one of the local and remote information sources includes second information associated with the first information.

33 Claims, 17 Drawing Sheets

U.S. PATENT DOCUMENTS

| | | | | |
|---|---|---|---|---|
| 5,761,656 | A | 6/1998 | Ben-Shachar | 707/4 |
| 5,781,189 | A | 7/1998 | Holleran et al. | 345/826 |
| 5,793,972 | A | 8/1998 | Shane | 709/219 |
| 5,794,228 | A | 8/1998 | French et al. | |
| 5,794,259 | A | 8/1998 | Kilkinis | 707/507 |
| 5,799,302 | A | 8/1998 | Johnson et al. | 707/7 |
| 5,805,886 | A | 9/1998 | Skarbo et al. | 709/318 |
| 5,815,830 | A | 9/1998 | Anthony | 707/6 |
| 5,826,257 | A | 10/1998 | Snelling, Jr. | 707/4 |
| 5,835,089 | A | 11/1998 | Skarbo et al. | 345/751 |
| 5,859,636 | A | 1/1999 | Pandit | 707/501.1 |
| 5,864,848 | A | 1/1999 | Horvitz et al. | 707/6 |
| 5,873,107 | A | 2/1999 | Borovoy et al. | 715/54.1 |
| 5,884,309 | A | 3/1999 | Vanechanos, Jr. | 707/10 |
| 5,893,093 | A | 4/1999 | Wills | 707/5 |
| 5,896,533 | A | 4/1999 | Ramos et al. | 709/217 |
| 5,907,838 | A | 5/1999 | Miyasaka et al. | 707/4 |
| 5,913,214 | A | 6/1999 | Madnick et al. | 707/10 |
| 5,924,074 | A * | 7/1999 | Evans | 705/2 |
| 5,924,090 | A | 7/1999 | Krellenstein | 707/5 |
| 5,926,808 | A | 7/1999 | Evans et al. | 707/3 |
| 5,930,471 | A | 7/1999 | Milewski et al. | 709/204 |
| 5,946,647 | A | 8/1999 | Miller et al. | 704/9 |
| 5,999,938 | A | 12/1999 | Bliss et al. | 707/102 |
| 6,006,218 | A | 12/1999 | Breese et al. | 707/3 |
| 6,021,403 | A | 2/2000 | Horvitx et al. | 706/45 |
| 6,026,398 | A | 2/2000 | Brown et al. | 707/5 |
| 6,067,565 | A | 5/2000 | Horvitz | 709/218 |
| 6,085,201 | A | 7/2000 | Tso | 715/505 |
| 6,085,226 | A | 7/2000 | Horvitz | 709/203 |
| 6,108,686 | A * | 8/2000 | Williams, Jr. | 709/202 |
| 6,182,133 | B1 | 1/2001 | Horvitz | 709/223 |
| 6,233,570 | B1 | 5/2001 | Horvitz et al. | 70/209 |
| 6,260,035 | B1 | 7/2001 | Horvitz et al. | 706/60 |
| 6,262,730 | B1 | 7/2001 | Horvitz et al. | 345/707 |
| 6,304,881 | B1 * | 10/2001 | Halim et al. | 707/201 |
| 6,323,853 | B1 * | 11/2001 | Hedloy | 345/810 |
| 6,388,957 | B2 * | 5/2002 | Yankowski | 369/30.06 |
| 7,051,019 | B1 * | 5/2006 | Land et al. | 707/4 |

OTHER PUBLICATIONS

Trial Transcript for C.A. No. 02-343T, *Arendi USA, Inc. et al.* vs. *Microsoft Corporationm et al.*, Sep. 13, 2004.
Trial Transcript for C.A. No. 02-343T, *Arendi USA, Inc. et al.* vs. *Microsoft Corporationm et al.*, Sep. 14, 2004.
Trial Transcript for C.A. No. 02-343T, *Arendi USA, Inc. et al.* vs. *Microsoft Corporationm et al.*, Sep. 15, 2004.
Trial Transcript for C.A. No. 02-343T, *Arendi USA, Inc. et al.* vs. *Microsoft Corporationm et al.*, Sep. 16, 2004.
Trial Transcript for C.A. No. 02-343T, *Arendi USA, Inc. et al.* vs. *Microsoft Corporationm et al.*, Sep. 17, 2004.
Trial Transcript for C.A. No. 02-343T, *Arendi USA, Inc. et al.* vs. *Microsoft Corporationm et al.*, Sep. 20, 2004.
Trial Transcript for C.A. No. 02-343T, *Arendi USA, Inc. et al.* vs. *Microsoft Corporationm et al.*, Sep. 21, 2004.
Trial Transcript for C.A. No. 02-343T, *Arendi USA, Inc. et al.* vs. *Microsoft Corporationm et al.*, Sep. 22, 2004.
Trial Transcript for C.A. No. 02-343T, *Arendi USA, Inc. et al.* vs. *Microsoft Corporationm et al.*, Sep. 23, 2004.
Trial Transcript for C.A. No. 02-343T, *Arendi USA, Inc. et al.* vs. *Microsoft Corporationm et al.*, Sep. 27, 2004.
Excerpt from Jury Charge Transcript for C.A. No. 02-343T, *Arendi USA, Inc. et al.* vs. *Microsoft Corporationm et al.*, Sep. 28, 2004.
United States Court of Appeals for the Federal Circuit, Appeal From the United States District Court for the District of Rhode Island in Case No. 02-CV-343, Judge Ernest C. Torres. Brief for Defendant-Cross Apellant Frank E. Scherkenbach Jul. 7, 2005.
United States District Court for the District of Rhode Island, 02-CV-343 (ECT) Defendant Microsoft Corporation's Motion for Judgment as a Matter of Law That the '853 Patent is Invalid, oct. 15, 2004.
United States Court of Appeals Federal Circuit, Brief for Plaintiff-Apellant, Frank E. Scherkenbach, Sep. 2, 2005.
United States District Court for the District of Rhode Island 02-CV-343 (ECT). Memorandum in Support of Defendant Microsoft Corporation's Opposition to Arendi's Motion for a New Trial. Patricia A. Sullivan, Oct. 27, 2004.
United States Court of Appeals for the Federal Circuit, Appeal From the United States District Court for the District of Rhode Island in Case No. 02-CV-343, Brief of Plaintiffs-Appellants Arendi U.S.A., Inc. and Arend Holding Limited. Donald R. Dunner, Apr. 25, 2005.
United States Court of Appeals for the Federal Circuit, Appeal From the United States District Court for the District of Rhode Island in Case No. 02-CV-343, Reply Brief for Defendant-Cross Appellant. Frank E. Scherkenbach, Oct. 3, 2005.
United States District Court for the District of Rhode Island, Order Denying Defendant Microsoft Corporation's Motion for Judgment as a Matter of Law That the '853 Patent is Invalid, C.A. No. 02-343T. Ernest C. Torres, Chief Judge, Nov. 30, 2004.
United States District Court for the District of Rhode Island. C.A. No. 02-343T. Order Denying Plaintiffs' Motion for New Trial. Ernest C. Torres, Chief Judge, Nov. 30, 2004.
Addressmate Automatic Envelope Addressing Program, User's Manual, 1991.
Peter Brown, Unix Guide, 1995.
N.D. Beitner, et al, Multimedia Support and Authoring in Microcosm: an extended model.
Lee E. McMahon, SED—A Non-interactive Text Editor, Bell Laboratories, Aug. 15, 1978.
SED(1), BSD Reference Manual Page.
AddresMate For Windows, Version 2.0, Product Box and License Agreement.
AddressMate Incorproates Correction Capability, The New York Law Publishing Company, Jan. 1996.
Lawrence J. Magid, Addressing the Matter of Labels, Los Angeles Times, Sep. 23, 1996.
Mar. 1996 Reviews, website available at www.techweb.com/winmag/library/1996/0396/03rvh002.htm.
Important Note for New AddressMate Users.
Important Tips for LabelWriter Owners Using AddressMate.
Adressing the Issues, Jun. 24, 1993.
AddressMate Advertisement "Whye Do it the Olde Way".
Philip Robinson, The Envelope, Please: It's AddressMate, San Jose Mercury News, Sunday, Jul. 19, 1992.
Steve Supkoff, AddressMate, PCM, Aug. 1992.
L.R. Shannon, Addressing Envelopes, The New York Times, Tuesday, Jul. 14, 1992.
Rob Schwabach, Addressing For Success, On Computers column, Mar. 16, 1992.
INFOWORLD, p. 15, Mar. 16, 1992.
Ken Hart, Simplify Envelope Printing with AddressMate, Computer Shopper.
Colvin's beta-testing of AddressMate sparks developer's appreciation, Westview, Apr. 6, 1992.
Press Release:AddressMate Software Automatically Addresses and bar Codes Envelopes to Save Time and money, Mar. 9, 1992.
Gearoge M> Long, Letter to Mr. David Block, Nov. 11, 1994.
Philip J. Damiano, Letter to Mr. David Block, Jan. 5, 1994.
AddressMate for Windows, Advertisement.
AddressMate Plus, Advertisement.
Ed Kahn, Envelope Addressing Finally Simplifieed AddressMate Does Addressing and Much More, Microtimes, Nov. 27, 1995.
Kirsten Bernthal, LabelWriter XL Plus, PC Catalog, Aug. 18, 1995.
David Plotkin, Address for Success, Bay Area Computer Currents, p. 36-38, Mar. 21, 1995.
Address Fixer for Microsoft Word and office, Product Box.
AddressMate Plus, Product Box and License Agreement.
Getting Results with Microsoft Office for Windows 95, Version 7.0, 1995.
Getting Results with Microsoft Office 97, copyright 1995-1997.

Microsoft Word, User's Guide, Version 6.0, copyright 1993-1994.
Apple Internet Address Detectors User's Manual, copyright 1997.
CTAGS(1) Manual Page.
Eve Wilson, Links and Structures in Hypertext Databases for Law, in Hypertext: Concepts, Systems and Applications, Proceedings of the First European Conference opn Hypertext, Nov. 1990.
Matt Bernstein, An Apprentice that Discovers Hypertext Links.
Contextual Menu Manager/Apple Data Detectors.
Eve Wilson, Guiding Lawyers: Mapping Law into Hypertext, Artificial Intelligence Review 6, pp. 161-189, 1992.
P.J. Brown et al, A Help System Based on UNIX Man Pages.
Charles H. Franke III et al, Authoring a Hypertext Unix Help Manual, 1995.
P.J. Brown, GUIDE User Manual, 1985, sixteenth impression, Apr. 1995.
E. Wilson, Cases for Justus: Preparing a Case Database for a Hypertext Information Retrieval System, Literary and Linguistic COmputing, vol. 5, No. 2, 1990.
John Robertson, et al, The Hypermedia Authoring Research Toolkit, ECHT 194 proceedings, pp. 177-185.
Mike Langberg, Apple Breaks New Ground by Displaying What on its drawing board, Aug. 7, 1996.
What is Wiki and Wiki History webpages, available at wiki.org/wiki.cgi?WhatIsWiki and www.c2.org/cgi/wiki?WikiHistory.
E. Wilson, Integrated Information Retrieval for Law in a Hypertext Environment, Annual ACM Conference on Research and Development in information Retrieval, 1988.
Multimedia Hyperlinks Automatically Created for Reference Documents, Research Disclosure, Jun. 1993.
Wiki Wiki Origin.
Joy-Lyn Blak, WikiWikiWeb, Computer World, Jan. 29, 2001.
Microsoft's Supplemental Responses to Arendl's Interrogatories, in *Arendl U.S.A. et al* v *Microsoft Corporation*, Civil Action 02-CV-343 (ECT) from United States District Court for the District of Rhode Island.
Apple Introduces Internet Address Detectors, Press Release, Sep. 7, 1997.
Cara Cunningham, Apple Kicks Off Macworld with talk of revival, new software demos, InfoWorld Electric, Aug. 7, 1996.
James Staten, Apple Looks to the Future, MacWeek, Aug. 7, 1996.
Mark Simmons, Striking a Key Note, Mac Addict Online, Aug. 8, 1996.
Jim Miller, email regarding Apple Data Detectors, Jan. 8, 1997.
Apple Data Detectors web page, Jan. 6, 1997.
Apple Data Detectors—Now Shipping web page, Jan. 6, 1997.
The Apple Data Detectors FAQ, Jan. 6, 1997.
Apple Data Detector Webpages, available on web.archive.org/web/20020601164217/www.apple.com/applescript/data_detectors.
Apple Data Detectors 1.0.2 Read Me.
Developer's Guide to Apple Data Detectors, Dec. 1, 1997.
AppleScript Editors, Utilities & Environments, available at www.applescriptsourcebook.com/links/applescripteditors.html, dated Jan. 11, 2004.
eMailman Internet Address Detectors.
Steve Tannehill, News from Jul. 1997.
Control-Click! The Archive.
Contextual Menus: One of System 8's Greatest Features, in ApplePress.
Contextual Menu Manager/Apple Data Detectors, available at web.archive.org/web/20020803063750/www.macemail.com/emailer/CEMH/contextual.shtml.
Trygve's CMM Plug-Ins Homer, available at web.archive.org/web/19980130053511/www.bombaydigital.com/cmms.
ADD Depot, available from web.archive.org/web/20000819091818/http://homepage.mac.com/mathewmiller/add.
Press Release: Apple Introduces Internet Address Detectors, Sep. 8, 1997.
MacWEEK Report, Aug. 8, 1996.
Mike Langber, Show of Potential Apple Breaks New Ground By Displaying What's on Its Drawing Board 'Innovation is at the heart of what we do', in San Jose Mercury News, Aug. 7, 1996, p. 1C.
Apple Introduces Internet Address Detectors, Newsbytes, Sep. 29, 1997.

Greg Williams, Strategy Mosaic: Understanding Apple's Dual OS Strategy.
Taking [control] of your Mac with System 8, The MacAuthority, Jan. 1999.
Apple Data Detectors 1.0.2, TidBITS Updates, Mar. 8, 1998.
Wood, Andrew, et al., CyberDesk: Automated Integration of Desktop and Network Services, GVU Technical Report, OIT-GVU-97-11, May 1997.
Gregory D. Abowd, Anidn Dey and Andy M. Wood, Applying Dynamic Integration as a Software Infastructure for Context-Aware Computing, GVU Technical Report, GIT-GVU-97-18, Sep. 1997.
Gregory D. Abowd, Anind Dey, Robert Orr and Jason Brotherson, Context-awareness in wearable and ubiquitous computing, GVU Technical Report, GIT-GVU-97-11, Mar. 1997.
Apple Data Detectors User's Manual, Jul. 1, 1997.
Apple Internet Address Detector User's Manual, Aug. 28, 1997.
Apple Introduces Internet Address Detectors, Sep. 8, 1997.
CoStar User Manual for AddressMate and AddressMate Plus.
ctags (UNIX Command).
Anind K. Dey and Gregory D. Abowd, CyberDesk: The Use of Perception in Context-Aware Computing, PUI Workshop Submission, Proc. of 1997 Workshop on Perceptual User Interfaces (PUI '97), pp. 26-27, Oct. 1997.
Anind K. Dey, Context-Aware Computing: The CyberDesk Project, Future Computing Environments, AAAI '98 Spring Symposium, Stanford University, pp. 51-55, Mar. 23-25, 1998.
Anind K. Dey, Gregory D. Abowd and Andrew Wood, CyberDesk: a framework for providing self-integrating context-aware services, Knowledge-Based Systems, vol. 11, No. 1, pp. 3-13, Sep. 1998.
Anind K. Dey, Gregory D. Abowd, Mike Pinkerton and Andrew Wood, CyberDesk: A Framework for Providing Self-Integrating Ubiquitous Software Services, GVU Technical Report, GIT-GVU-97-10, May 1997.
L. Nancy Garrett, Karen E. Smith and Norman Meyrowitz, Intermedia: Issues, Strategies, and Tactics in the Design of a Hypermedia Document System, (c) 1986, pp. 163-174.
Eve Wilson, Links and Structures in hypertext databases for law, Proceedings of the First European Conference on Hupertext, INRIA, Nov. 1990.
Mike Langberg, 'Innovation is at the heart of what we do', Apple breaks new ground by displaying what's on its drawing board, Mercury News, Aug. 7, 1996, pp. 1-2.
Henry Lieberman, Bonnie A . Nardi and David Wright, Training Agents to Recognize Text by Example, Proc. of the Third4Annual Conference on Autonomous Agents, Seattle, WA, pp. 116-122, 1999.
Microsoft Word 6.0, for Windows and Macintosh.
Bonnie A. Nardi, James R. Miller and David J. Wright, Collaborative, Programmable Intelligent Agents, Website, Mar. 1998, pp. 1-11.
Milind S. Pandit and Sameer Kalbag, The Selection Recognition Agent: Instant Access to Relevant Information and Operations, Proc. of Intelligent User Interfaces 1997, Orlando, FL, 1997.
Spell, iSpell Spellout.
WikiWikiWeb.
Apple Data Detectors 1.0.2, TidBITS #419, Mar. 9, 1998.
Tonya Engst, More Context on Contextual menus, TidBITS #399, Sep. 29, 1997.
Tonya Engst, Of Mice and Menus, TidBITS #398, Sep. 22, 1997.
Charles Whaley, Will this be enough to kick-start Apple?, Computing Canada, Aug. 4, 1997.
MacOS8.com—Mac OS 8 Indepth.
A Farewell to the Apple Advanced Technology Group, SIGCHI, vol. 30, No. 2, Apr. 1998.
James R. Miller and Thomas Bonura, From Documents to Objects, in SIGCHI, vol. 30, No. 2, Apr. 1998.
Thomas Bonura and James R. Miller, Drop Zones, in SIGCHI, vol. 30, No. 2, Apr. 1998.
Bonnie A. Nardi, et al., Collaborative, Programmable Intelligent Agents, Communications of the ACM, vol. 41, No. 3, Mar. 1998.

* cited by examiner

METHOD, SYSTEM AND COMPUTER READABLE MEDIUM FOR ADDRESSING HANDLING FROM AN OPERATING SYSTEM

CROSS REFERENCES TO RELATED APPLICATIONS

The present invention is related to commonly owned U.S. patent application Ser. No. 09/189,626, now U.S. Pat. No. 6,323,853 incorporated herein by reference.

BACKGROUND OF THE INVENTION

1. Field of the Invention

This invention relates to a method, system and computer readable medium for name and address handling (hereinafter called "address handling"), and more particularly to a touch screen, keyboard button, icon, menu, voice command device, etc. (hereinafter called "button") provided in a computer program, such as a word processing program, spreadsheet program, etc., or operating system, such as WINDOWS™ operating system, MACINTOSH™ operating system, etc., and coupled to an information management source for providing address handling within a document created by the computer program or within the operating system.

2. Discussion of the Background

In recent years, with the advent of programs, such as word processors, spreadsheets, etc. (hereinafter called "word processors") and operating systems, such as WINDOWS™ operating system, MACINTOSH™ operating system, etc., users may require retrieval of information, such as name and address information, etc., for insertion into a document, such a letter, fax, etc., created with the word processor or for contact management at the operating system level. Typically, the information is retrieved by the user from an information management source external to the word processor, such as a database program, contact management program, etc., or from the word processor itself, for insertion into the document. Examples of such word processors are WORD™, NOTEPAD™, EXCEL™, WORDPAD™, WORDPERFECT™, QUATROPRO™, AMIPRO™, etc., and examples of such information management sources are ACCESS™, OUTLOOK™, ORACLE™, DBASE™, RBASE™, CARDFILE™, etc.

However, the information in the database must constantly be updated by the user. This requires the user to learn how to use and have access to the database. In this case, a change in the information, such as change in an address or a name, etc., requires the user of the word processor to implement this change in the database, or alternatively, the change is made to the database centrally by a database administrator.

SUMMARY OF THE INVENTION

Accordingly, an object of the present invention is to provide a method, system and computer readable medium for address handling within a computer program or operating system.

Another object of the present invention is to provide a method, system and computer readable medium for address handling within a computer program, such as a word processing program, spreadsheet program, etc, or operating system, such as such as WINDOWS™ operating system, MACINTOSH™ operating system, etc.

Another object of the present invention is to provide a method, system and computer readable medium for address handling within a computer program or operating system, using an input device provided in the computer program.

Another object of the present invention is to provide a method, system and computer readable medium for address handling within a computer program or operating system, using an input device, such as a touch screen, keyboard button, icon, menu, voice command device, etc., provided in the computer program and coupled to an information management source.

Another object of the present invention is to provide a method, system and computer readable medium for address handling within a computer program or operating system using an input device provided in the computer program or operating system and coupled to local and/or remote information management source, such as a database program, contact management program, computer network, Internet site, etc.

Another object of the present invention is to provide a method, system and computer readable medium for address handling within a computer program or operating system using an input device provided in the computer program or operating system and coupled to local and remote information management source, such as a database program, contact management program, computer network, Internet site, etc., wherein data found in the local database is related to data found in the remote database.

The above and other objects are achieved according to the present invention by providing a novel method, system and computer readable medium for information handling within an operating system, including providing a record retrieval program; providing an input device within a window or screen of the operating system and configured to enter an execute command which initiates a record retrieval from local and remote information sources using the record retrieval program; using the record retrieval program to enter first information into search fields provided in the record retrieval program; entering the execute command using the input device after the step of entering the first information; searching, using the record retrieval program, the local and remote information sources for second information associated with the first information; and displaying the second information in the record retrieval program, when one of the local and remote information sources includes second information associated with the first information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DESCRIPTION OF THE PREFERRED EMBODIMENTS

Figure 1:
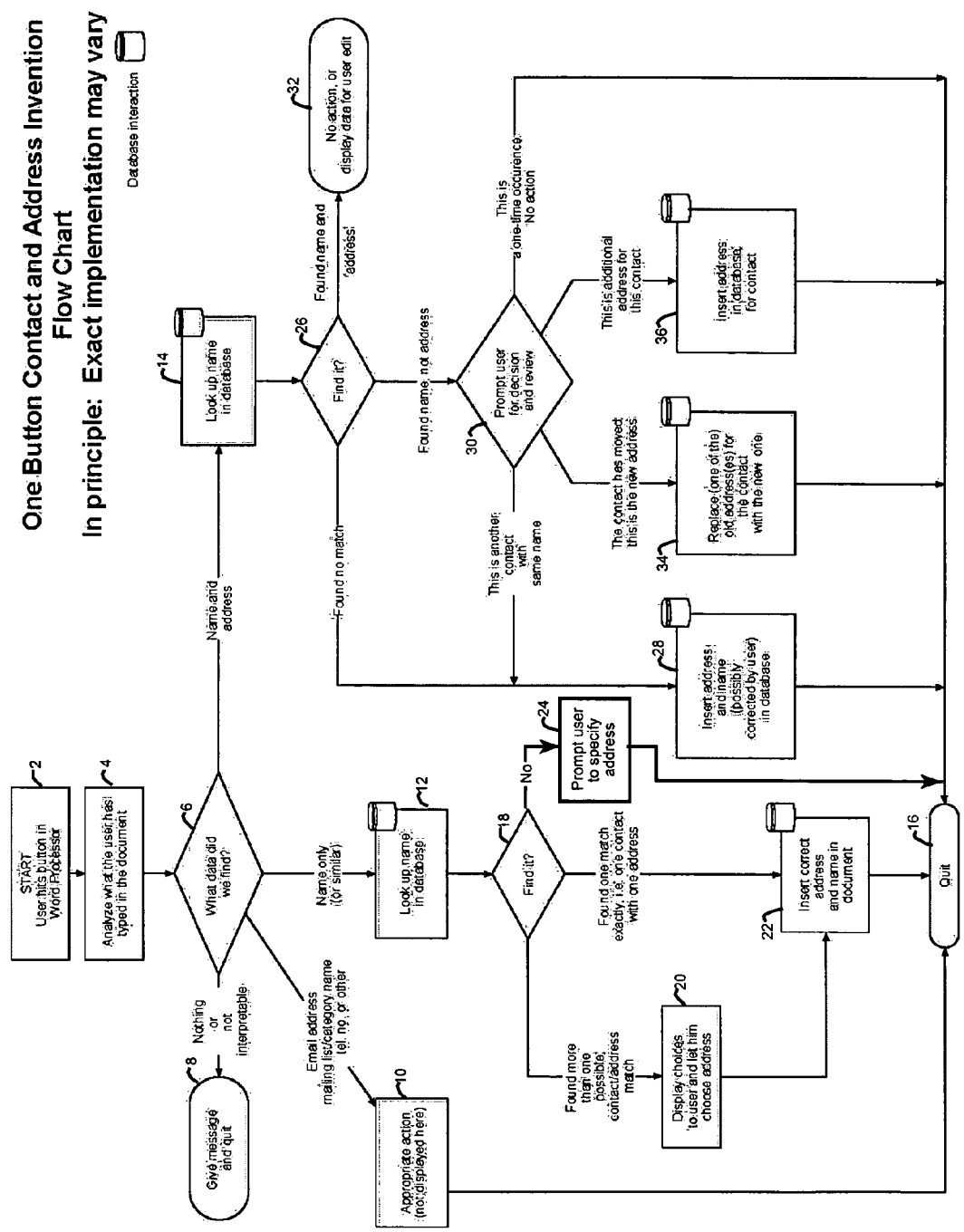
FIG. 1 is a flow chart illustrating a method for address handling within a computer program, according to an exemplary embodiment of the present invention.

In an embodiment of the present invention, single button addressing is achieved by providing an input device, such as a touch screen, keyboard, icon, menu, voice command device, etc. (hereinafter called "button"), in a computer program, such as a word processing program, spreadsheet program, etc. (hereinafter called "word processor"), or an operating system, such as WINDOWS™ operating system, MACINTOSH™ operating system, etc., for executing address handling therein.

Accordingly, in a word processor or operating system, the button is added and a user types information, such as an addressee's name, or a part of the name, etc. in a document created with the word processor, such as a letter, fax, etc., and then clicks, selects, commands, etc. the button via the appropriate input device, such as a touch screen button, keyboard button, icon, menu choice, voice command device, etc. A program then executes and retrieves the typed information from the document, and searches a local (i.e., the user's personal computer or an Intranet coupled to the user's personal computer) or remote (i.e., the Internet) information management source, such as a database, file, database program, contact management program, etc. (hereinafter called "database") to determine if the information, such as the name or part of the name typed and searched by the program exists in the database. If the program does not find stored information, such as a name, corresponding to the name or part of the name typed, the user is asked by the program whether the information, such as the name that was not found, should be added to the local database. In addition, the user may enter any other information besides the name, such as addresses, businesses, telephone numbers, fax numbers, e-mail address, etc., so that this other information can be stored in the local database for later use.

If the program finds name(s) and address(es) corresponding to the part of the addressee's name typed, this additional information is automatically entered into the user's word processor, optionally with a confirmation from the user that this is the correct data and stored in the local and/or remote database. If the typed address information does not correspond to data already stored in the local or remote database, after clicking on the button, the program, for example, lets the user decide: (1) if this is new data (e.g., a new address) for an existing contact; (2) if the stored data should be changed to what the user just typed; (3) if this is a new contact with the same name as one already entered into the database; or (4) if the typed address is only to be used once, and therefore not to be stored in the database at all. If, later, for example, a name with several address stored in the local or remote database is recalled, all addresses for this contact will be displayed, so that the correct address can be selected by the user.

The program may be extended to also store and retrieve other information, such as telephone numbers, fax numbers, e-mail addresses, etc. Once the program recalls the telephone numbers, fax numbers, e-mail addresses, etc., the user can command the program to send e-mails, faxes, etc. Similarly, if the user types in the name of a mailing list, the program create merge letters, group e-mails, etc.

Figure 2:
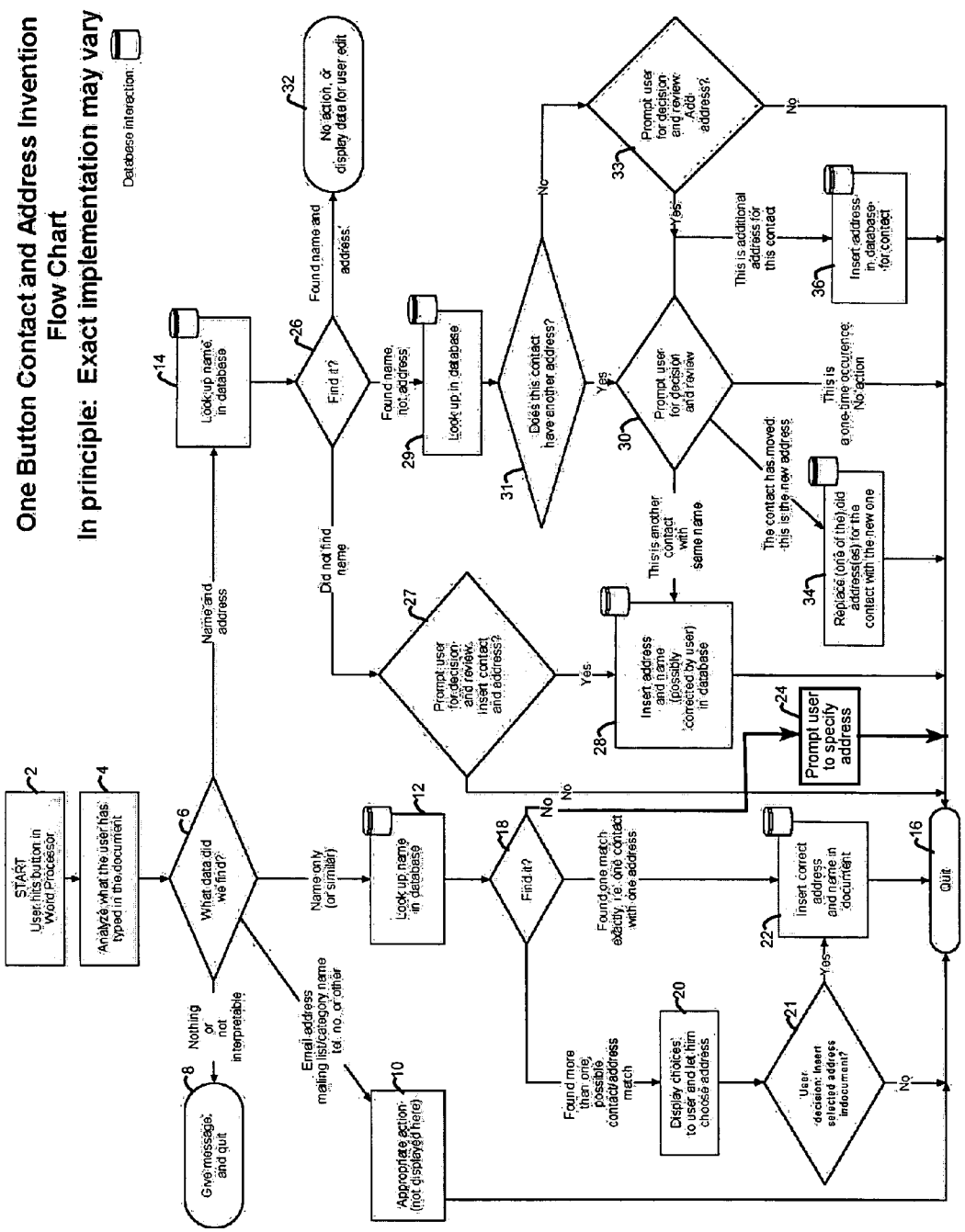
FIG. 2 is a flow chart illustrating a method for address handling within a computer program, according to another exemplary embodiment of the present invention.

Referring now to the drawings, wherein like reference numerals designate identical or corresponding parts throughout the several views, and more particularly to FIGS. 1 and 2 thereof, there is illustrated flow charts of single button addressing, according to exemplary embodiments of the present invention.

In FIG. 1, after the user has inserted the address in the word processor, the user commands the button at step 2 and the program analyzes what the user has typed in the document at step 4. At step 6, the program decides what was found in the document and if the program found nothing in the document or what it found was un-interpretable the program goes to step 8 and outputs an appropriate message to the user and then quits at step 16. The program analyzes what the user has typed in the document at step 4, for example, by analyzing (i) paragraph/line separations/formatting, etc.; (ii) street, avenue, drive, lane, boulevard, city, state, zip code, country designators and abbreviations, etc.; (iii) Mr., Mrs., Sir, Madam, Jr., Sr. designators and abbreviations, etc.; (iv) Inc., Ltd., P.C., L.L.C, designators and abbreviations, etc.; and (v) a database of common male/female names, etc.

If the program finds an e-mail address mailing list/ category name telephone number or other information, at step 10 an appropriate action is performed by the program and then the program execution quits at step 16. If the program only finds a name or initials, or the like, the program looks up the name in the database at step 12 and at step 18 the program determines what was found. If the program finds more than one possible contact/address match, at step 20 the program displays menu choices to the user to let him choose an appropriate answer. Then at step 22 the program inserts a correct address and name in the document and then at step 16 the program quits execution. If the program finds one match exactly, i.e., one contact with one address, the program inserts the correct address and name in the document at step 22 and then quits execution at step 16. If the program does not find a name in the database, at step 24 the program prompts the user to specify an address and then quits execution at step 16. If the program at step 6 finds a name and an address, at step 14 the name is looked up in the database. Then, at step 26, if no match is found, at step 28 the program inserts an address and a name which are possibly corrected by the user into the database and then quits execution at step 16. If at step 26, the name and address is found, at step 32 the program either takes no action or displays the data for the user to edit. If at step 26, the name is found but not the address, the program prompts the user for a decision at step 30. If the user decides that this another contact with a same name, the program goes to step 28. If the user decides that this is a one time occurrence, no action is taken and the program quits at step 16. If the user decides that the contact has, for example, moved and that this is a new address, at step 34 one of the old addresses for the contact is replaced with the new one and the program quits at step 16. If the user decides that this is an additional address for the contact, at step 36 the additional address is inserted into the database for that contact and execution quits at step 16.

The flowchart shown in FIG. 2 is similar to the flowchart in FIG. 1, except for some additional steps which will now be discussed. At step 6, if the program only finds a name or a similar name then the name is looked up in the database at step 12, then at step 18 if the program found more than one possible contact/address match, the program displays choices to the user to let him choose an address at step 20. Then at step 21 the user decides whether to insert the selected address into the document. If the user does not decide to select the address into the document the program quits execution at step 16. If the user decides to insert the selected address into the document, the program inserts the address and name into the document at step 22 and then quits at step 16.

If the program finds a name and address in the database at step 6, then at step 14 the program looks up the name in the database and at step 26 the program determines what it has found. If the program does not find the name at step 26, at step 27 the program prompts the user for a decision and review and whether to insert the contact and address. If the user does not decide to insert the contact address, the program quits at step 16. If the user decides to insert the contact address, at step 28 the program inserts the address and name which may be possibly corrected by the user or program in the database and then execution quits at step 16.

If at step 26 the program finds a name and not an address, then at step 29 the name is looked up in the database. Then at step 31 the program decides whether this contact has another address. If the contact does not have another address, at step 33 the program prompts the user for a decision and review and whether to add the address. If the user does not want to add the address at step 33, the program quits at step 16. If the user wants to add the address at step 33 because this is an additional address for the contact, at step 36 the address is inserted in the database for the contact and execution quits at step 16.

At step 30, if the user decides that this is another contact with a same name, then the program goes to step 28. If at step 30 the user decides that this is a one time occurrence, then the program quits at step 16. If at step 30, the user decides that the contact has, for example, moved, the program goes to step 34. If at step 30, the user decides that this is an additional address for the contact, at step 36 the program inserts the address in the database for the contact and then quits at step 16.

Various exemplary screen shots which are generated during execution of the program, according to the present invention, will now be described with reference to FIGS. 3–15 and examples 1–7 as follows.

EXAMPLE 1

Retrieving an Existing Address from the Database

Figure 3:
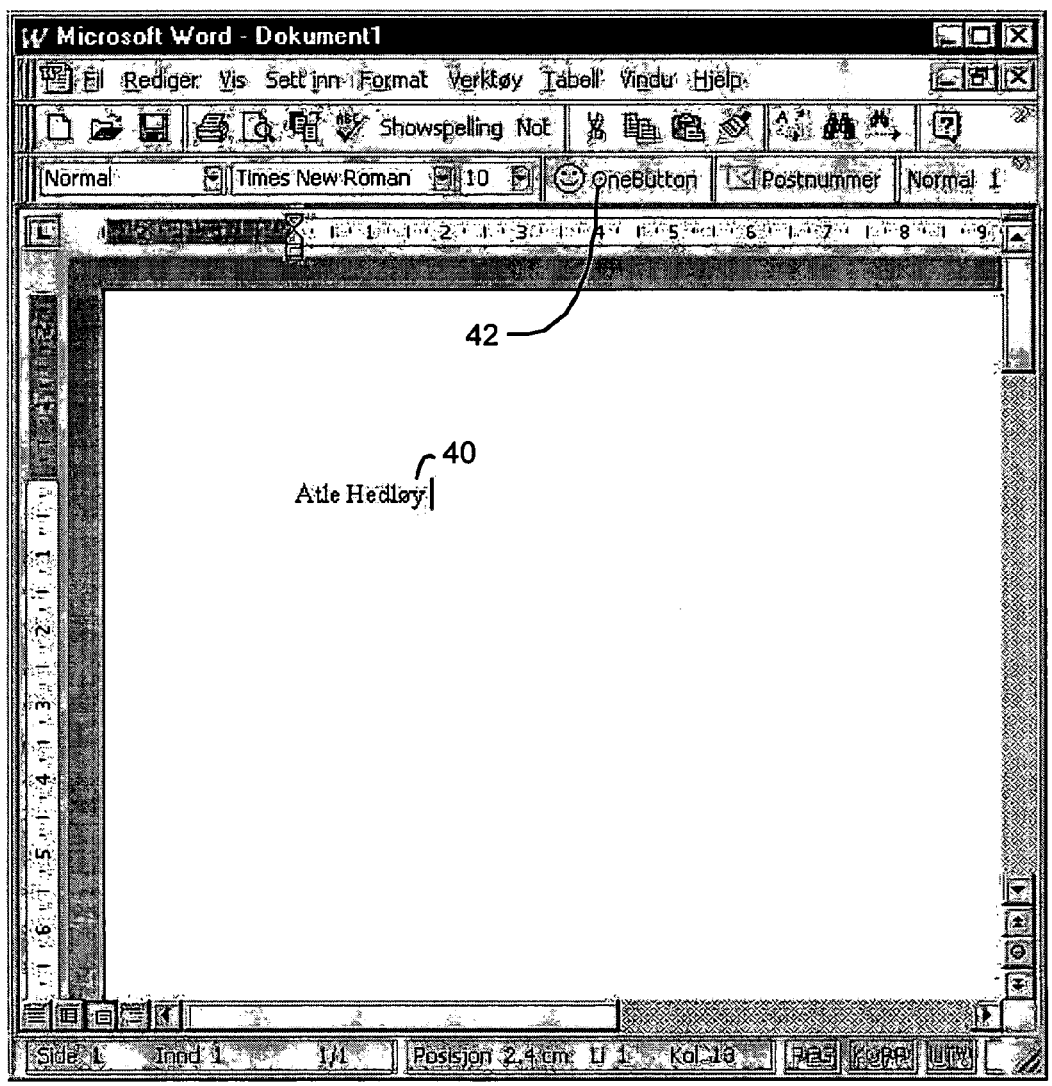
FIG. 3 is a screen shot illustrating the inputting of a name to be searched and an address handling button within a word processor, according to an exemplary embodiment of the present invention.

FIG. 3 illustrates a starting point in word processor document, such as a WORD™ document, wherein the user has typed a name 40. The user hits the button 42, for example, marked "OneButton" and the program according to the present invention retrieves the name 40 from the document, searches a database for the name 40, and inserts the retrieved address 44 associated with the name 40 into the document as shown in, for example, FIG. 4.

The above example corresponds to steps 2, 4, 6, 12, 18, 22 and 16 in the flow charts of FIGS. 1 and 2.

EXAMPLE 2

Adding a New Contact to the Database

Figure 5:
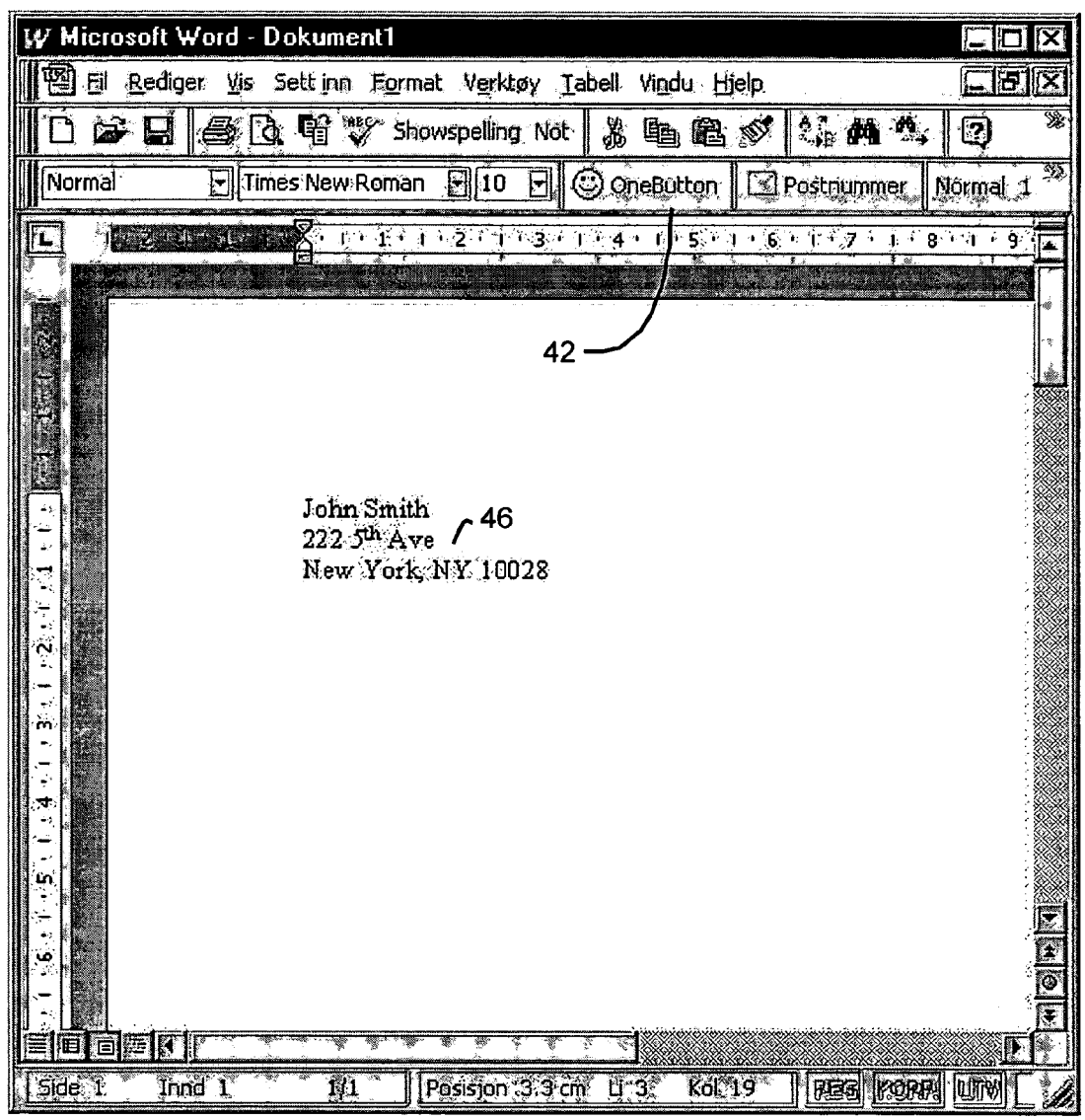
FIG. 5 is a screen shot illustrating the inputting of a name and address to be searched and an address handling button within a word processor, according to an exemplary embodiment of the present invention.
Figure 6:
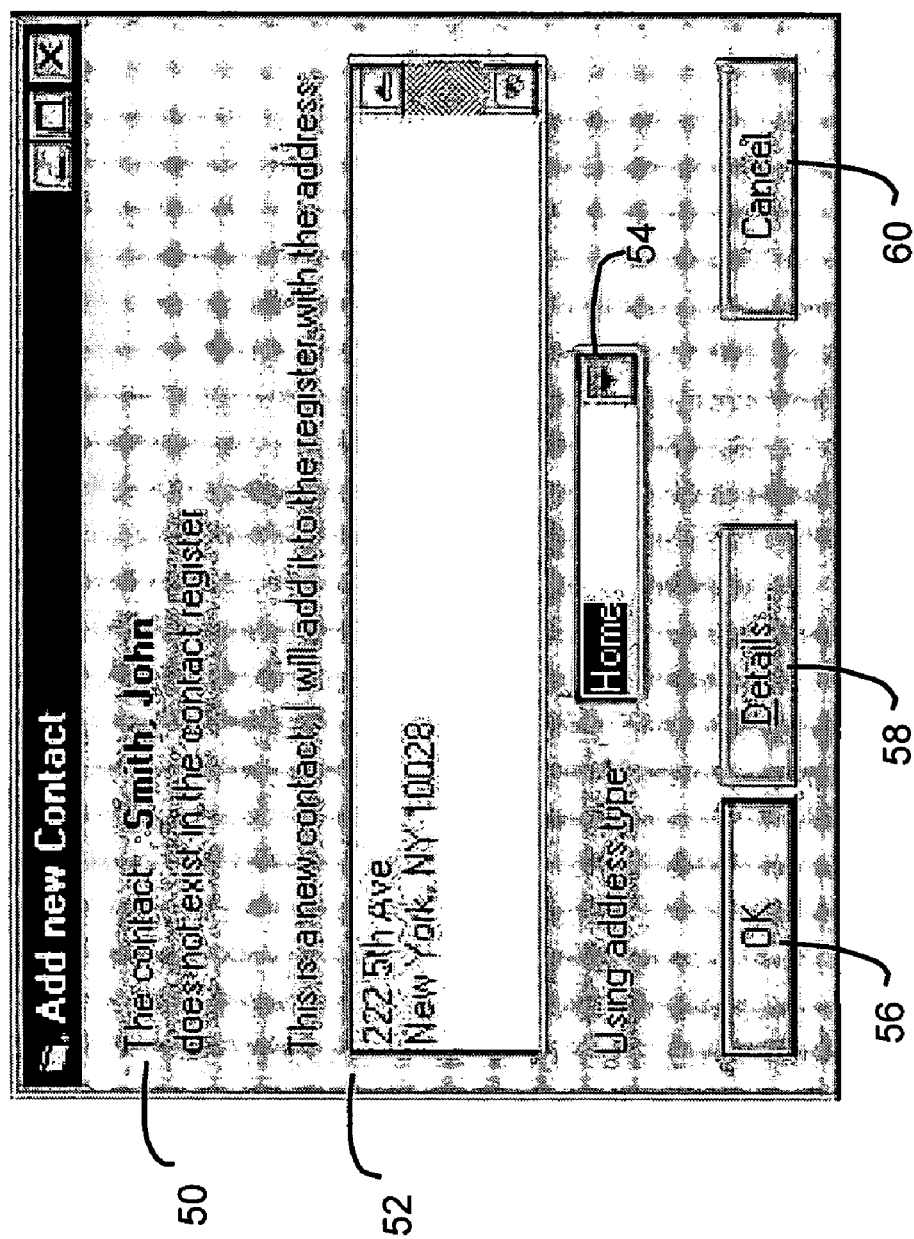
FIG. 6 is a screen shot illustrating an add new contact message window, according to an exemplary embodiment of the present invention.
Figure 7:
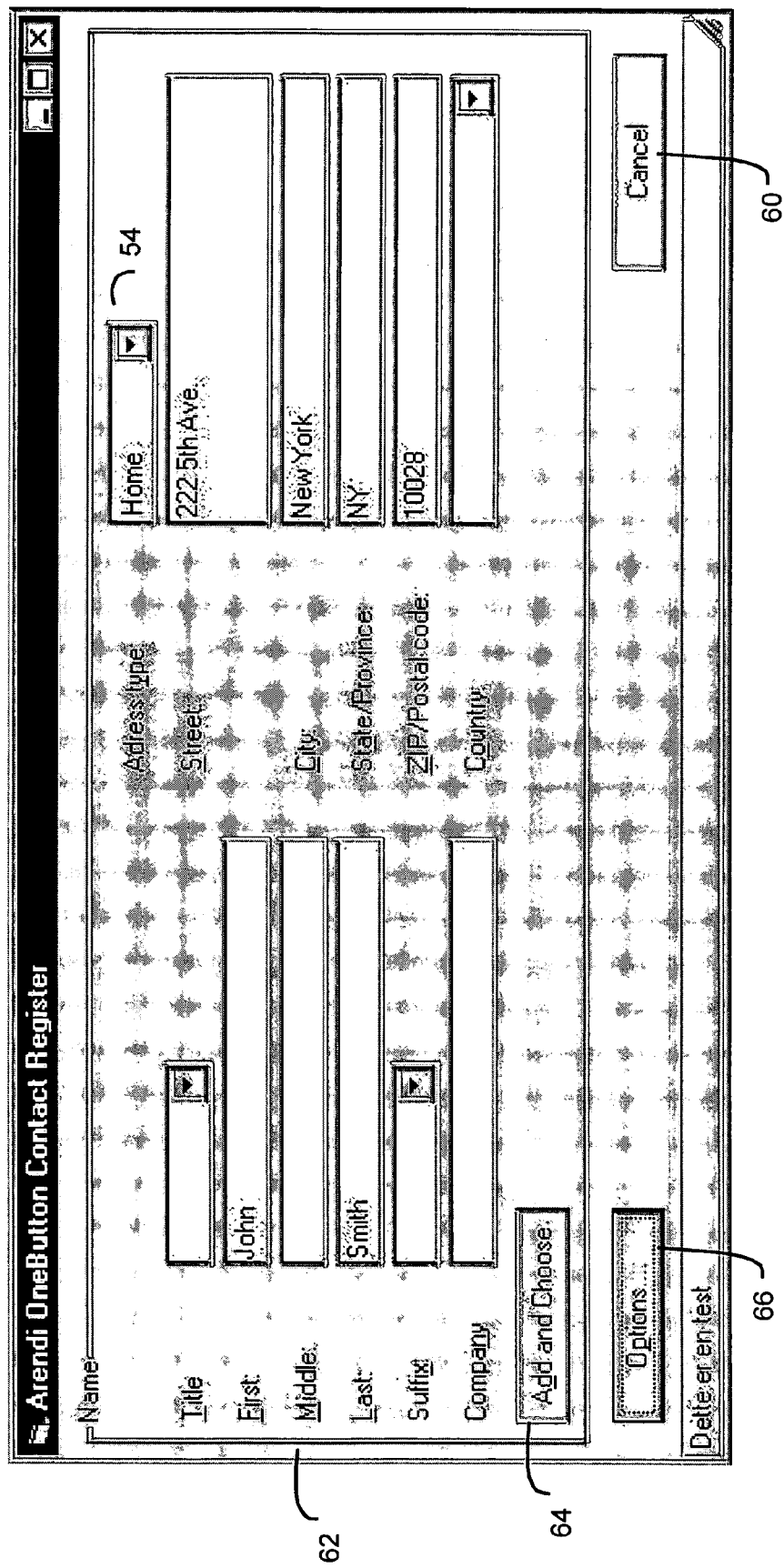
FIG. 7 is a screen shot illustrating a contact register message window, according to an exemplary embodiment of the present invention.
Figure 8:
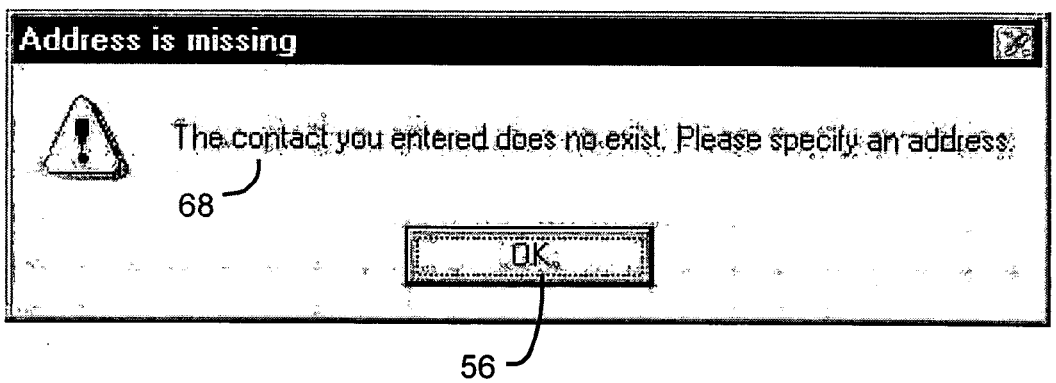
FIG. 8 is a screen shot illustrating an address missing message window, according to an exemplary embodiment of the present invention.
Figure 9:
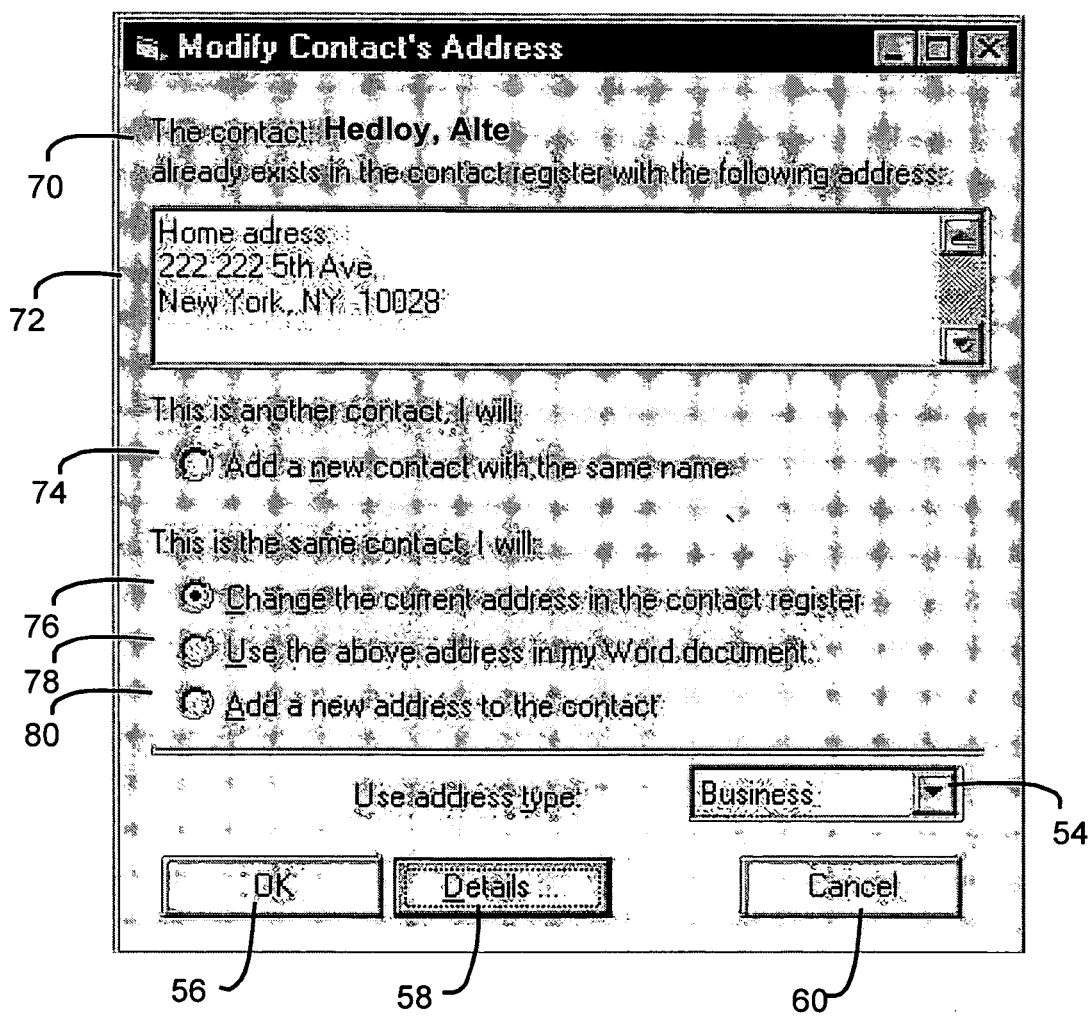
FIG. 9 is a screen shot illustrating a modify contact's address message window, according to an exemplary embodiment of the present invention.

FIG. 5 illustrates a starting point in word processor document, such as a WORD™ document, wherein the user has typed a name and address of a new contact 46. The user commands the button 42, for example, marked "OneButton," and the program according to the invention retrieves the new contact 46 from the document, searches a database for the name of the new contact 46 and generates a screen as shown in, for example, FIG. 6. This screen includes a message 50 informing the user that the new contact does not exist in the database, a message 52 including the address retrieved from the document, an address type selection 54, such as home, business, etc., and "OK," "Details," and "Cancel" buttons 56, 58, and 60, respectively.

At this point, the user can cancel the operation by commanding the Cancel button 60, ask the program to store data in the database and return to the document by commanding the OK button 56, or check details before storing data into the database by commanding the Details button 58. If the user commands the Details button 58, as shown in, for example, FIG. 7, a message screen is provided so that the user can review and edit data 62 and the selection 54, store the data 62 and 54 in the database by commanding a "Add and Choose" button 64, see more options by commanding an "Options" button 66, or cancel the operation by commanding the Cancel button 60.

The above example corresponds to steps 2, 4, 6, 14, 26, 28 and 16 in the flow chart of FIG. 1 and steps 2, 4, 6, 14, 26, 27, 28 and 16 in the flow chart of FIG. 2.

EXAMPLE 3

Try to Retrieve Existing Address, but Contact is not in Database

FIG. 3 illustrates a starting point in word processor document, such as a WORD™ document, wherein the user has typed a name of a contact 40. The user commands the button 42, for example, marked "OneButton," and the program according to the present invention retrieves the name 40 from the document, searches a database for the name of the contact 40 and generates a screen as shown in, for example, FIG. 8. This screen includes a message 68 informing the user that the contact does not exist in the database and to specify an address, and "OK" buttons 56. At this point when the user commands the OK button 56, the user returns to the document so that the contact's address can be included as in Example 2 above.

The above example corresponds to steps 2, 4, 6, 12, 18, 24 and 16 in the flow charts of FIGS. 1 and 2.

EXAMPLE 4

Adding a New Address for an Existing Contact (Short Version)

Figure 4:
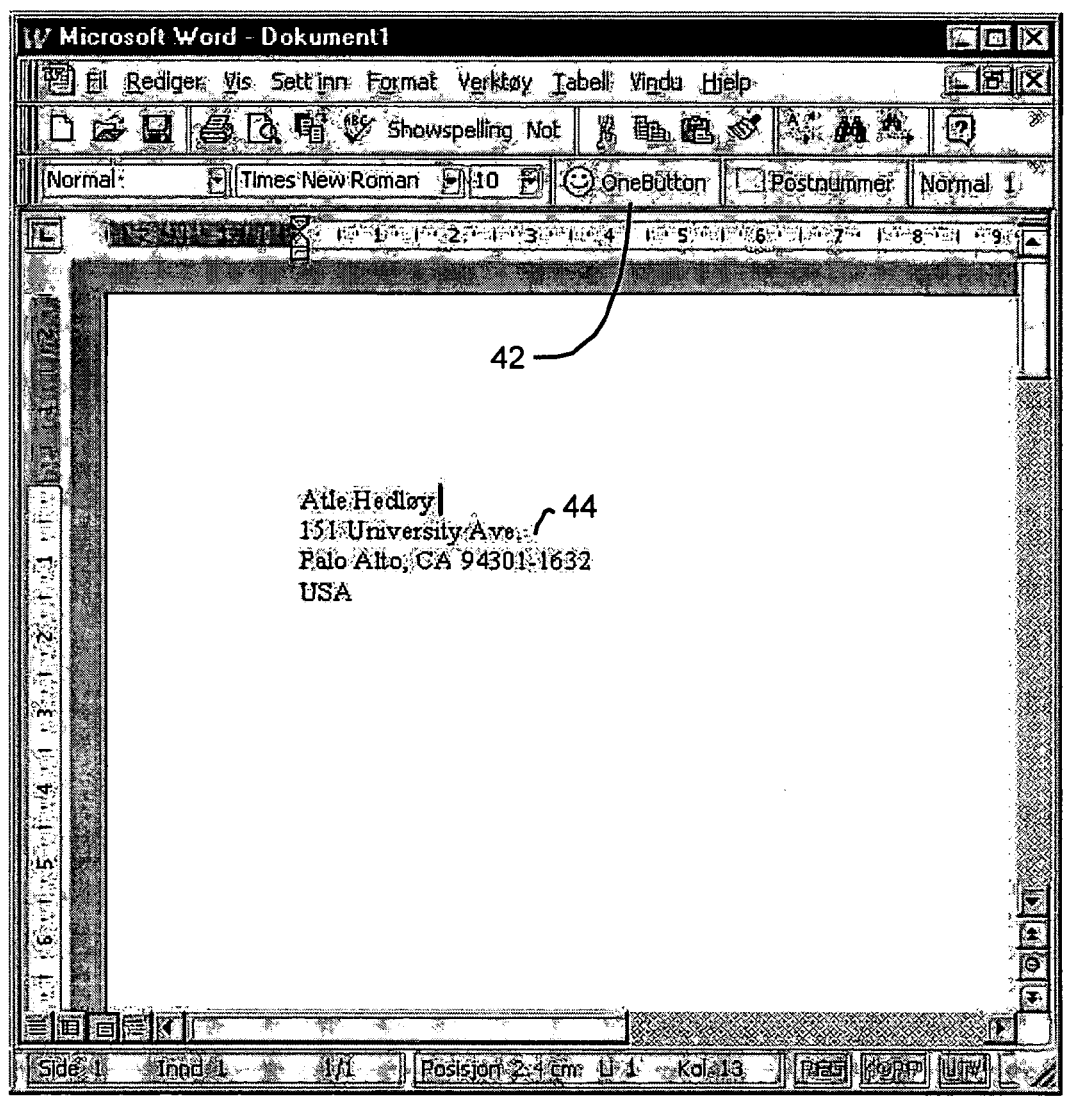
FIG. 4 is a screen shot illustrating a retrieved address in a word processor, according to an exemplary embodiment of the present invention.

FIG. 4 illustrates a starting point in word processor document, such as a WORD™ document, wherein the user has typed a name and new address of an existing contact 44. The user commands the button 42, for example, marked "OneButton," and the program according to the present invention retrieves the existing contact 44 from the document, searches a database for the name of the existing contact 44 and generates a screen as shown in, for example, FIG. 9. This screen includes a message 70 informing the user that the contact already exits in the database with an existing address, a message 72 including the existing address, add new contact with same name selection 74, change existing address selection 76, use existing address in document selection 78, add the new address to contact selection 80, the address type selection 54, such as home, business, etc., and the "OK," "Details," and "Cancel" buttons 56, 58, and 60 respectively. At this point, the user may select one of the four options 74–80, and command the OK button 56 to execute the selected options. The user can also cancel the operation by commanding the Cancel button 60, or check details before storing data into the database by commanding the Details button 58.

The above example corresponds to steps 2, 4, 6, 14, 26, 28, 30, 34, 36, and 16 in the flow chart of FIG. 1 and steps 2, 4, 6, 14, 26, 29, 31, 30, 28, 34, 36, and 16 in the flow chart of FIG. 2.

EXAMPLE 5

Selecting Between Several Possible Matching Addresses

FIG. 3 illustrates a starting point in word processor document, such as a WORD™ document, wherein the user has typed a name and possibly address of at least one existing contact 40. The user commands the button 42, for example, marked "OneButton," and the program according to the present invention retrieves the existing contact 40 from the document, searches a database for the name of the existing contact 40 and generates a screen as shown in, for example, FIG. 10. This screen includes a message informing the user that the name corresponds to several addresses and possible contacts which already exist in the database, with existing contacts and addresses for selection 82, a message 84 including the full name and address for the contact that the user selects in 82, the Options button 66, a "Choose" button 86, a "Full details" button 88, a "More>>>" button 90, and the Cancel button 60. The above screen indicates to the user that at least one contact with the same name exists, and that there are more than one addresses and/or contacts that match.

Figure 10:
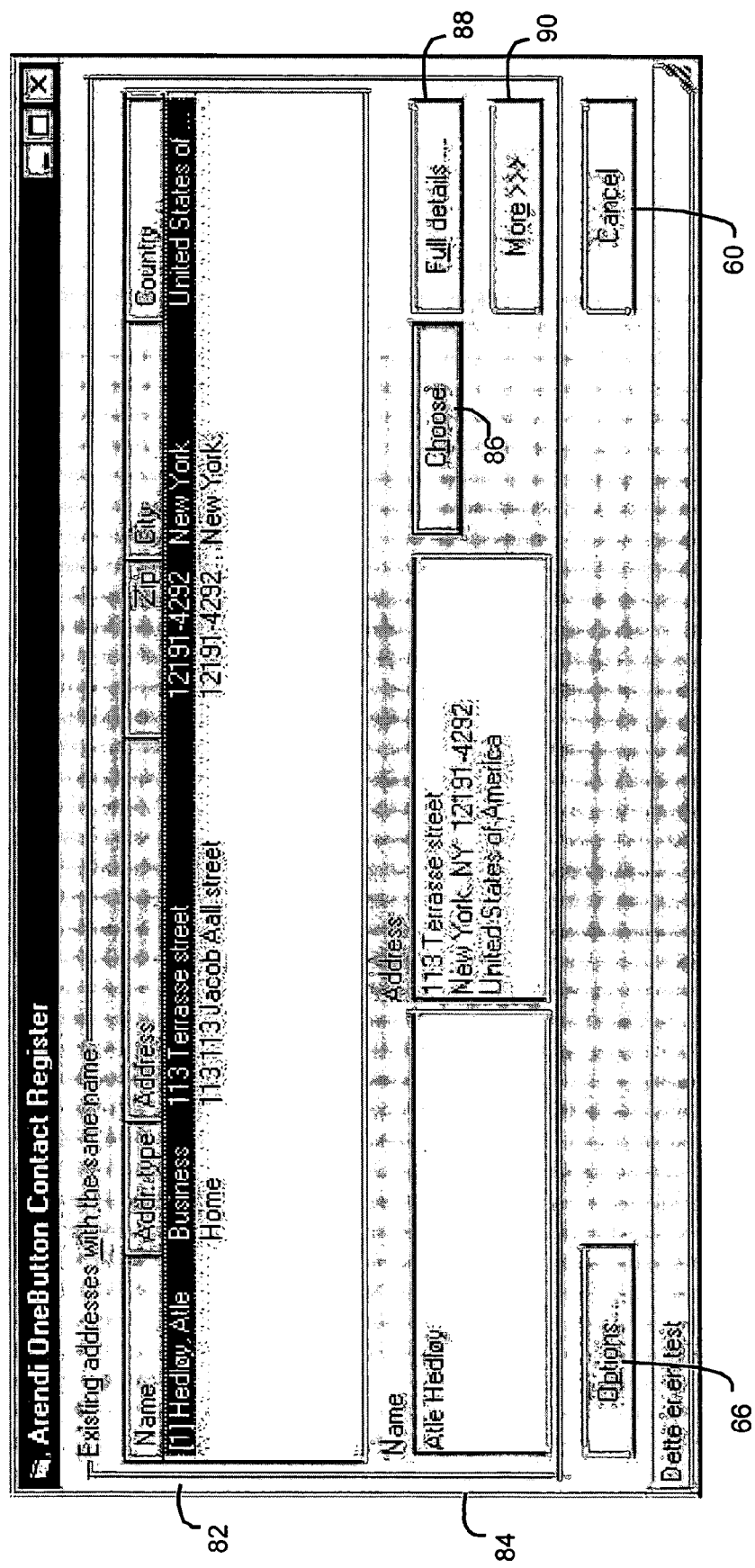
FIG. 10 is a screen shot illustrating a select a contact address register message window, according to an exemplary embodiment of the present invention.
Figure 11:
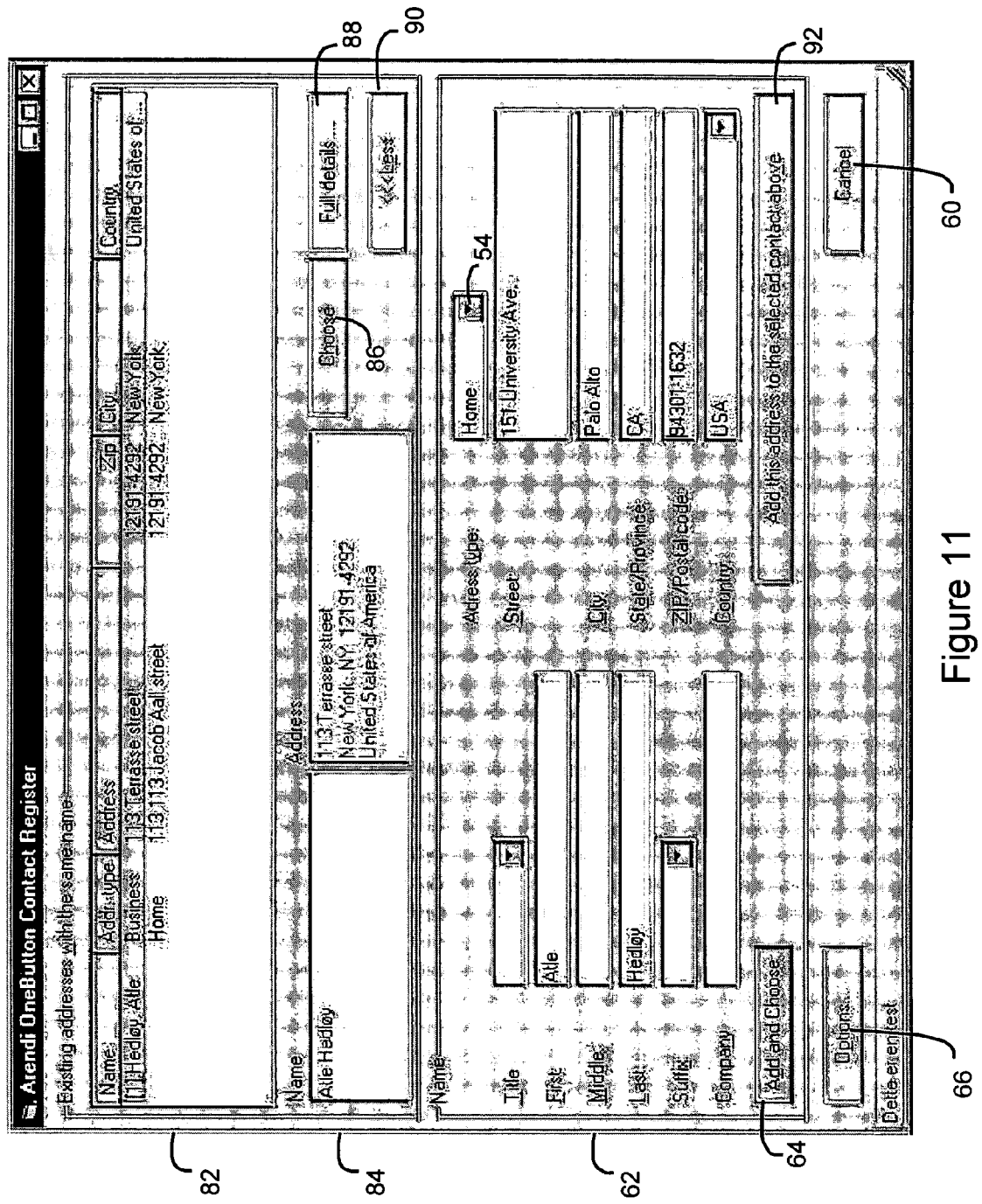
FIG. 11 is a screen shot illustrating a more detailed mode of registering an additional address for the contact register of FIG. 9, according to an exemplary embodiment of the present invention.

At this point, the user may command the Choose button 86 to use the selected address and return to the document, or the user may command the More>>> button 90 to view how the program interpreted what the user typed in the word processor, and possibly change this data, wherein the program generates an updated screen as shown in, for example, FIG. 11. The updated screen includes the data 62 which displays the name typed in the word processor as interpreted by the program, address fields, and the fields for the address type selection 54, such as home, business, etc., which may be changed by the user before the program stores it in the database, the Add and Choose button 64, a "<<<Less" button 90 corresponding to the More>>> button 90 for returning to the screen of FIG. 10, and an "Add this address to the selected contact above" button 92. The user might then command the Add this address to the selected contact above button 92 and the result in the word processor is illustrated in FIG. 4. The user can also cancel the operation by commanding the Cancel button 60, or command the add choose button 64 to add this name and address as a new contact and address, or open the database before storing data into the database by commanding a "Full details" button 88 as will be later described.

The above example corresponds to steps 2, 4, 6, 12, 18, 20, 22, and 16 in the flow chart of FIG. 1 and steps 2, 4, 6, 12, 18, 20, 21, 22, and 16 in the flow chart of FIG. 2.

EXAMPLE 6

Adding a New Address for an Existing Contact (Long Version)

Figure 12:
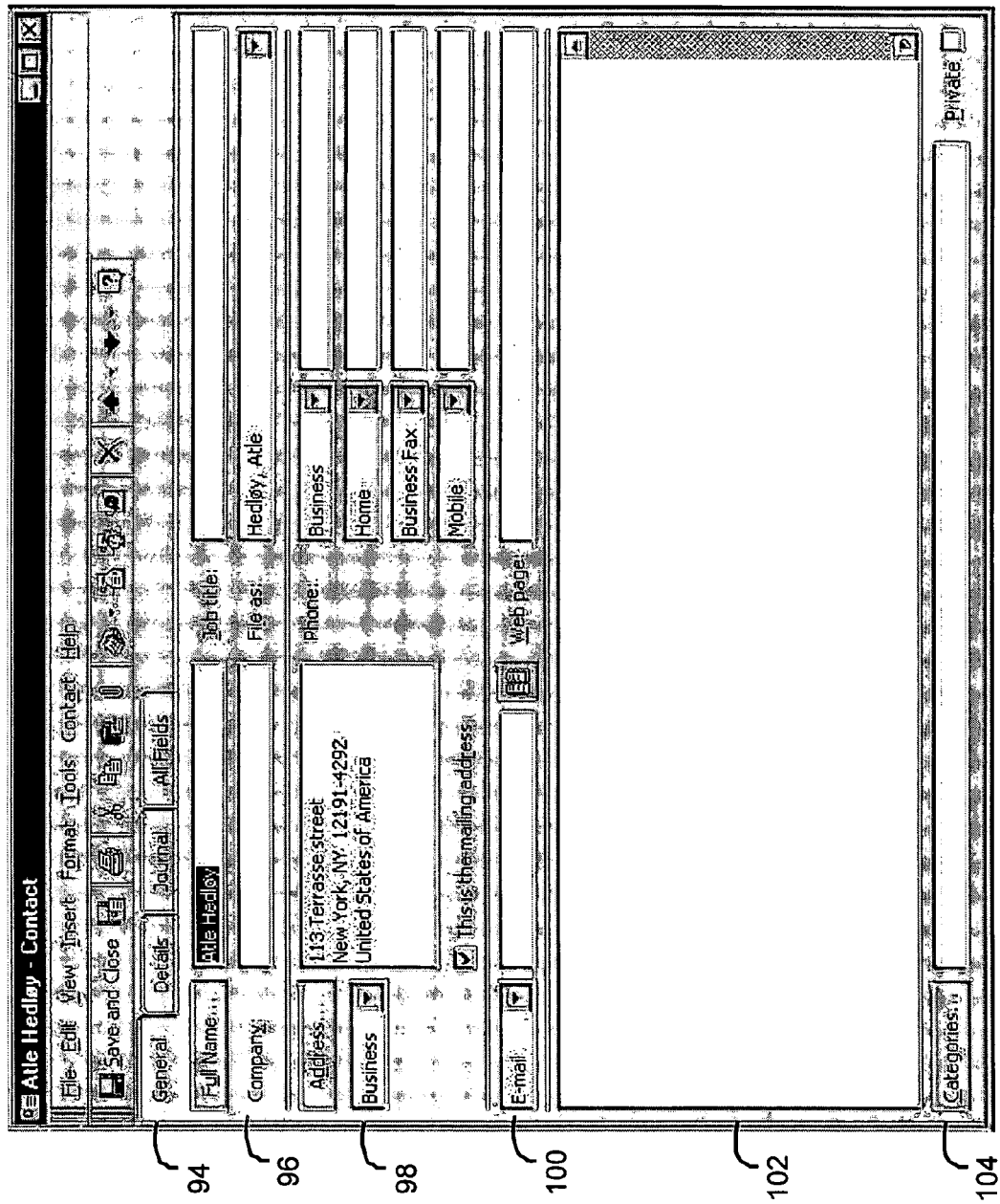
FIG. 12 is a screen shot illustrating a contact management program window in a full detailed mode, according to an exemplary embodiment of the present invention.
Figure 13:
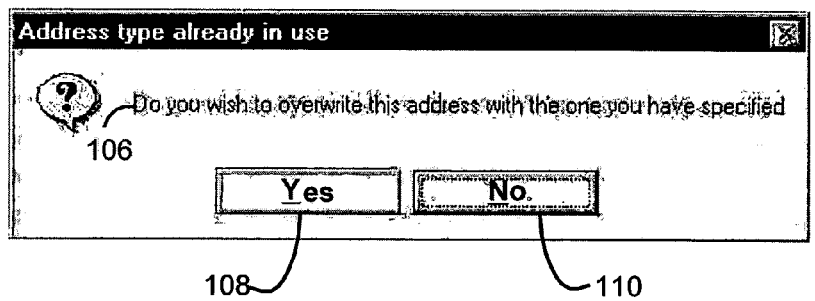
FIG. 13 is a screen shot illustrating an address already in use message window, according to an exemplary embodiment of the present invention.

FIG. 4 illustrates a starting point in word processor document, such as a WORD™ document, wherein the user has typed a name and new address of an existing contact 44. The user commands the button 42, for example, marked "OneButton," and the program according to the present invention retrieves the existing contact 44 from the document, searches a database for the name of the existing contact 44 and generates a screen as shown in, for example, FIG. 9. As previously described, the screen includes a message 70 informing the user that the contact already exits in the database with an existing address, and the user may command the Details button 58 to see the details of the new address for potentially modify the details before they are stored in the database and the program generates a screen as shown in, for example, FIG. 10. From this screen, the user may choose to use another address than the one he typed, and return to the document, or the user may command the "Full details" button 88 to enter a database program, such as OUTLOOK™, directly as shown in, for example, FIG. 12. In FIG. 12, the database program, such as OUTLOOK™, may include portions 94–104 for allowing the user to modify various pieces of data before they are stored in the database.

Alternatively, in the screen shown in FIG. 10, the user may command the More>>> button 90 at which time the program generates the screen as shown in, for example, FIG.

11 and as previously described. In this screen, the user might then command the Add this address to the selected contact above button 92. If the address typed is already in use, the program generates a screen including a message 106, and "Yes" and "No" buttons, 108 and 110, respectively, as shown in, for example, FIG. 13. If the user hits the Yes button 108 the program overwrites the contact address with the address specified by the user (e.g., if the contact has moved) and the result in the word processor is shown in, for example, FIG. 4.

The above example corresponds to steps 2, 4, 6, 12, 14, 26, 28, 30, 34, 36, and 16 in the flow chart of FIG. 1 and steps 2, 4, 6, 12, 14, 26, 29, 31, 30, 28, 34, 36, and 16 in the flow chart of FIG. 2.

EXAMPLE 7

Spreadsheet Application

Figure 14:
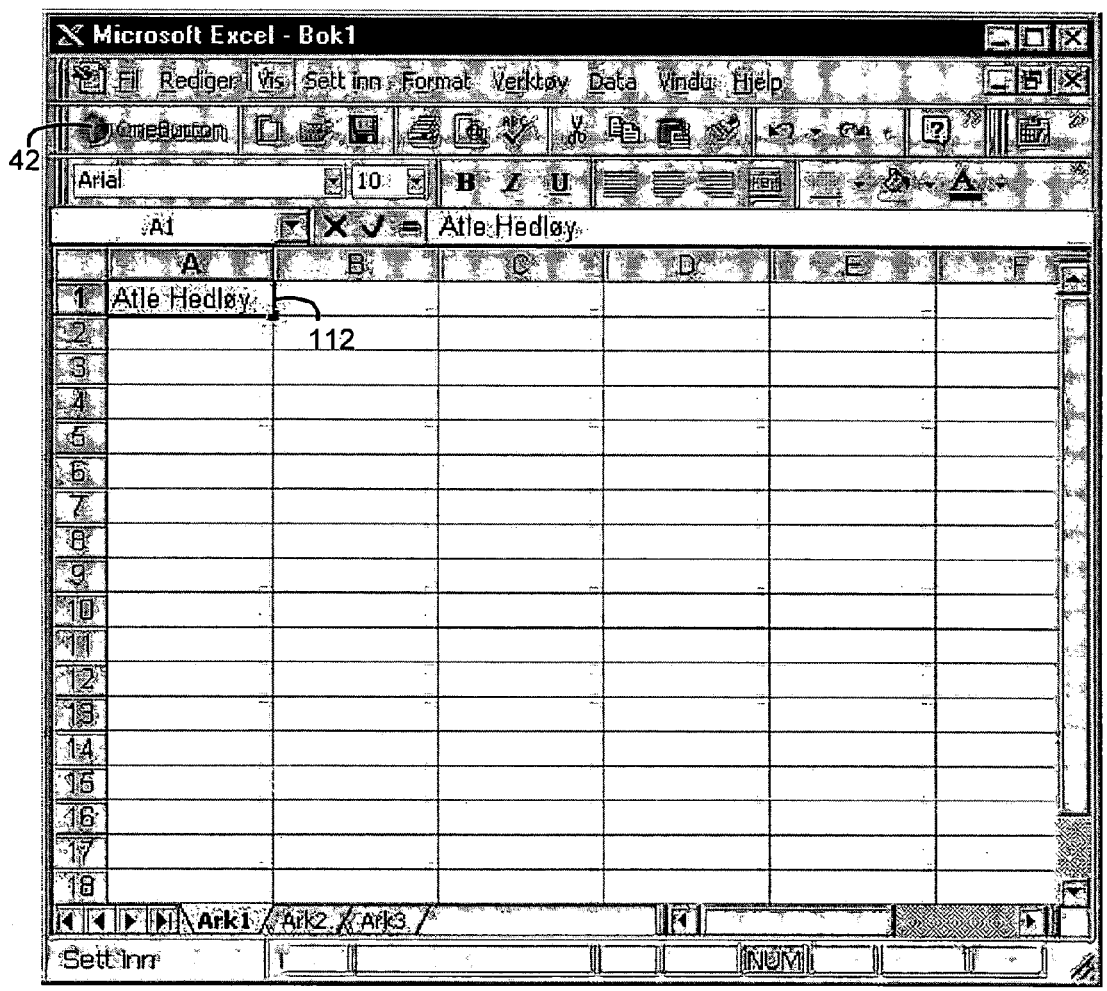
FIG. 14 is a screen shot illustrating the inputting of a name to be searched and an address handling button within a spreadsheet, according to an exemplary embodiment of the present invention.
Figure 15:
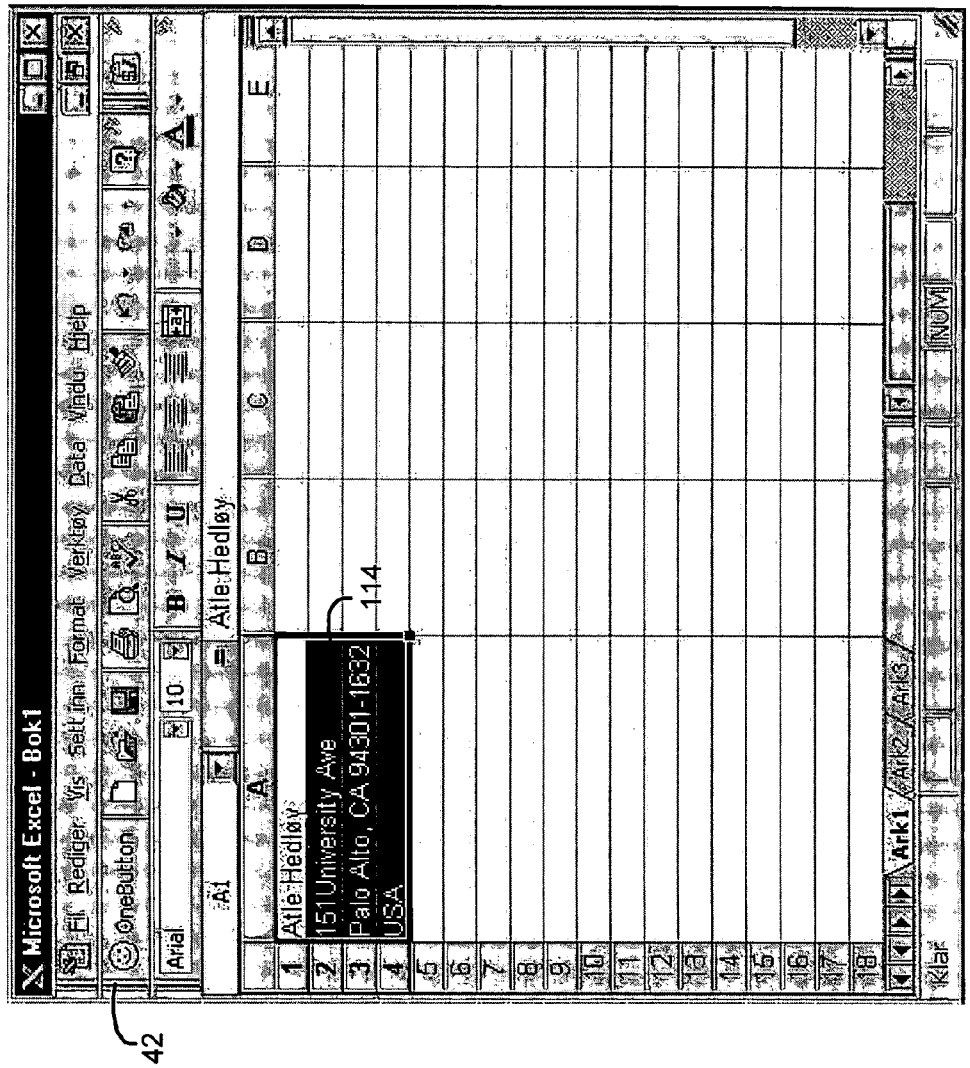
FIG. 15 is a screen shot illustrating a retrieved address in a spreadsheet, according to an exemplary embodiment of the present invention.

FIG. 14 illustrates a starting point in word processor document, such as an EXCEL™ spreadsheet, wherein the user has typed a name 112. The user hits the button 42, for example, marked "OneButton," and the program according to the present invention retrieves the name 112 from the spreadsheet, searches a database for the name 112, and inserts the retrieved address 114 into the spreadsheet as shown in, for example, FIG. 15. Accordingly, the examples 1–6 apply not only to word processor documents, such as WORD™ documents, etc., but to other word processor documents, and spread sheets, such as EXCEL™ spreadsheets, etc.

The above example corresponds to steps 2, 4, 6, 12, 18, 22 and 16 in the flow charts of FIGS. 1 and 2.

Up to this point, the single button addressing program has been described in terms of providing a device for address handling within a computer program, such as a word processor or spread sheet. The following embodiment of the single button addressing program runs on a client (e.g., a computer, cell phone, or palm top device) operating system and integrates local address and phone number data with network data, such as data obtained from an Intranet or the Internet, resolving differences and presenting them in a unified format.

The single button addressing program works within word processing, personal information management, etc., software (e.g, as previously described). The single button addressing program allows the data found on a network Intranet or Internet site to be saved in the local database and checked against network data as it changes, without the network database being aware of the local database. The network can be a public network, such as the Internet, or a private data network, such as an Intranet. The local database can be a database management system, such as Microsoft ACCESS™, Microsoft SQL server, etc., running on the local computer or any accessible server. The local database can also be an application, such as a personal information manager like Microsoft OUTLOOK™ or Symantec Act!™, etc., that maintains a database therein. Similarly, the remote database may be a public or private data service, a Web-based data source, or a CD-ROM of information used in the user's computer or computer network.

The invention according to the present embodiment performs data integration in the following way: (1) the address handling function is typically implemented as a subprogram within a larger program, such as the single button address program provided in a word processor as previously described or as single button address program provided in an operating system as will be later described; (2) the subprogram is started with a complete or partial name and address; (3) the subprogram queries the local and remote databases and compares the results; (4) the subprogram provides user interface for the user to select the appropriate result wherein the choices are marked based on whether the data is remote or local. If data was originally remote and the user saved it locally, the user is alerted if the data has changed on the remote database; (5) if the data chosen by the user is different or not present in the local database, the user is given the opportunity to save the data locally; and (6) the chosen address is returned to the calling program, which may, for example, include it in a document.

Figure 16:
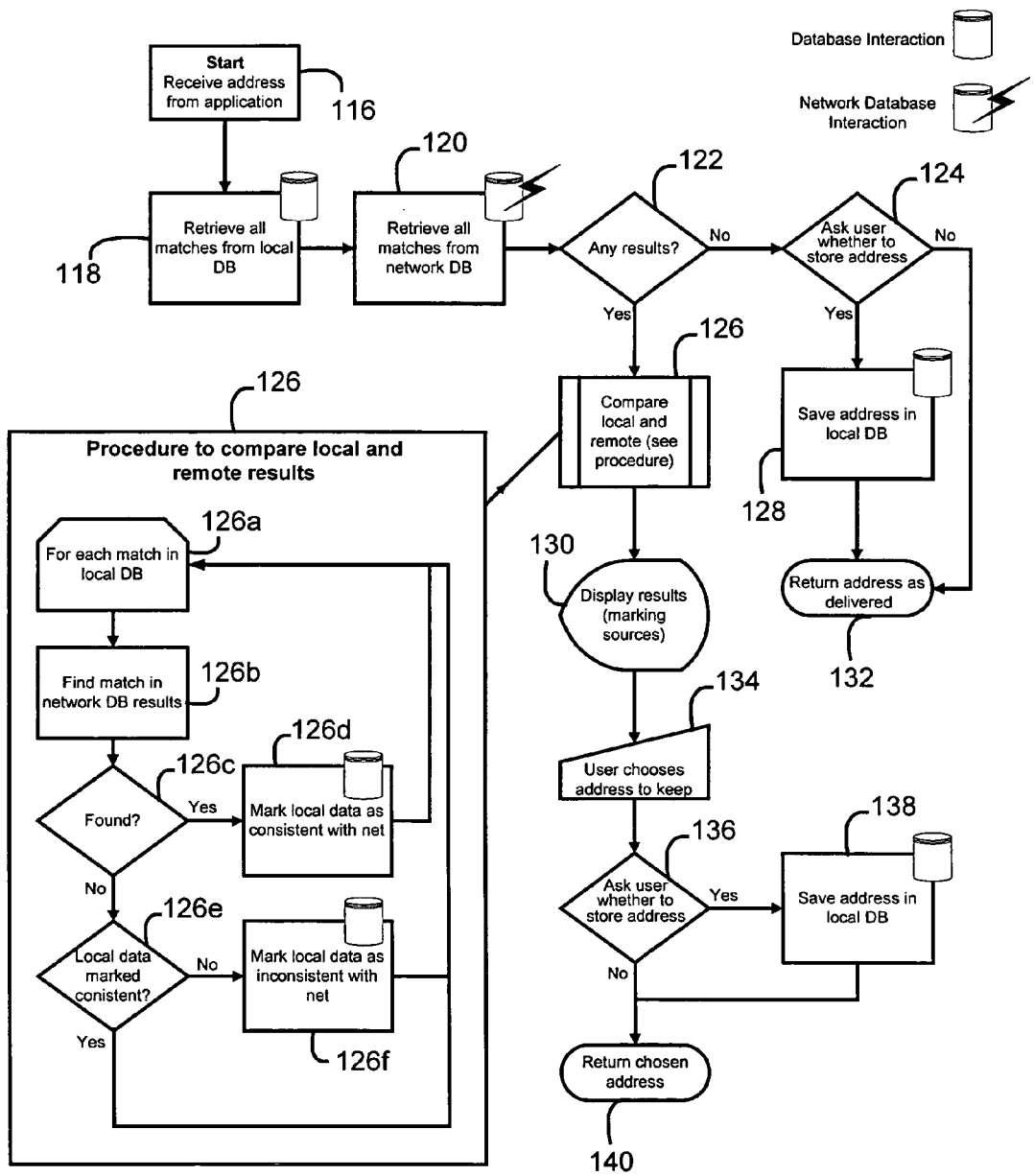
FIG. 16 is a flow chart illustrating a method for address handling within an operating system, according to another exemplary embodiment of the present invention.

FIG. 16 illustrates a method for address handling from an operating system, such as WINDOWS™ operating system, MACINTOSH™ operating system, etc., according to the present embodiment of the invention. In FIG. 16, at step 116, an address is received from an application or is entered directly into the single button addressing subprogram. At step 118, the subprogram retrieves all matches from a local database. At step 120, the subprogram retrieves all matches from a network or remote database.

At step 122, the subprogram determines whether or not there are any matching address results. If there are no matching results, the user is given the opportunity to store or not to store the address at step 124. If the user chooses to store the address, at step 128 the address is stored in the local database. If the user chooses not to store the address, at step 132 the address is returned to the calling program as delivered to the user and without being stored in the local database.

If at step 122 the subprogram determines that there are matching results, the local and remote matching database results are compared at step 126 as follows. At step 126*a*, for each match in the local database, step 126*b* determines whether or not there is a corresponding match in the remote or network database results. At step 126*c*, if a match is found between the local and remote databases, the matching result is marked as local data which is consistent with the network data. At step 126*c*, if no match is found between the local and remote databases, step 126*e* determines whether or no the local data was marked as consistent with the network data. If the local data was not marked as consistent with the network data, at step 126*f* the local data is marked as inconsistent with the network data. If the local data was marked as consistent with the network data, control transfers back to step 126*a* to process the next match in the local database.

Figure 17:
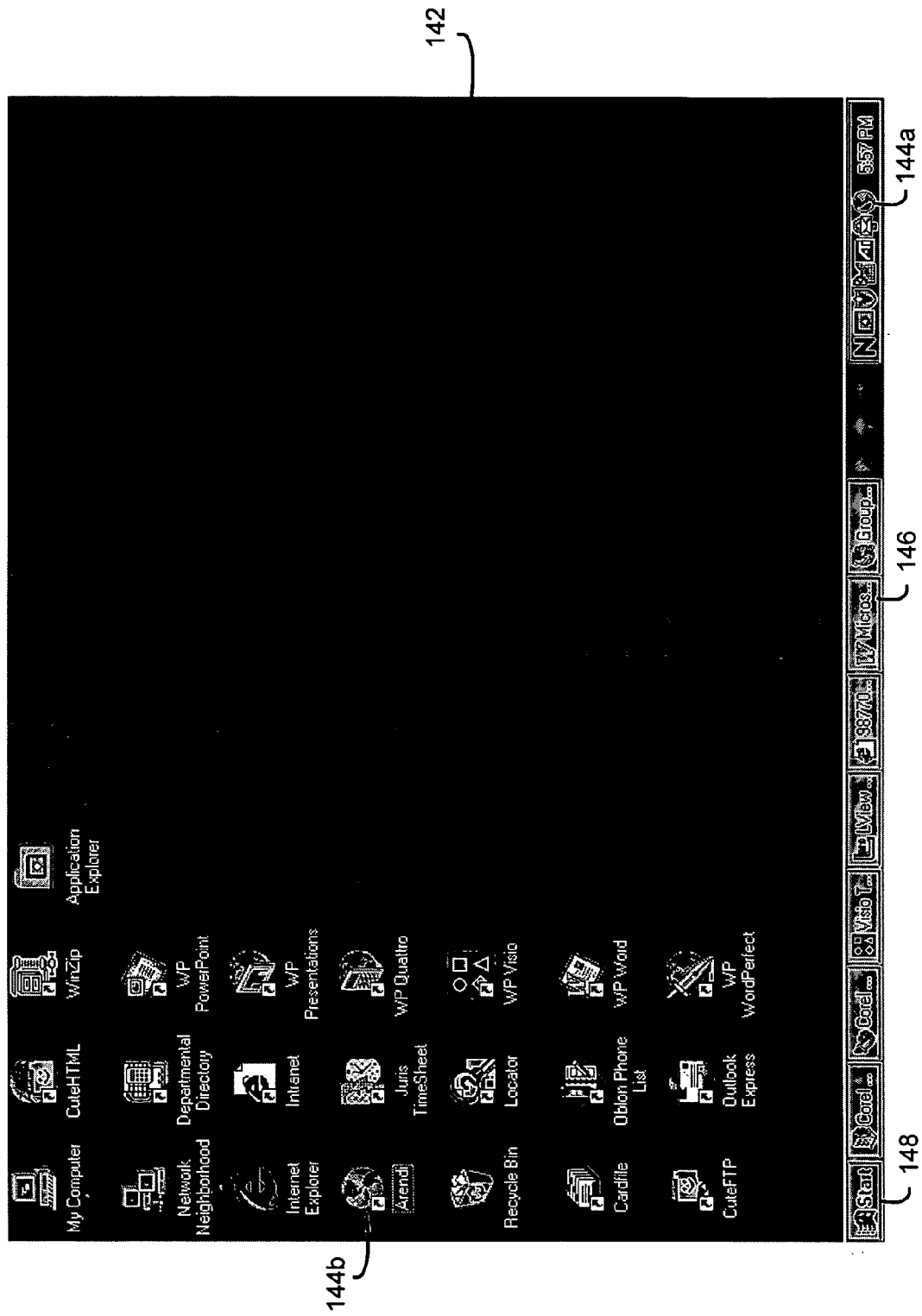
FIG. 17 is a screen shot illustrating an operating system window including means for address handling therein, according to an exemplary embodiment of the present invention.

FIG. 17, illustrates an exemplary operating system screen 142, such as a WINDOWS 95™ operating system screen, including the single button addressing subprogram implemented as tool bar subprogram 144*a* or as a desktop icon subprogram 144*b*. The single button addressing subprogram can also be launched from a word processing application 146, as previously discussed, or via the WINDOWS 95™ Start menu 148.

Figure 18:
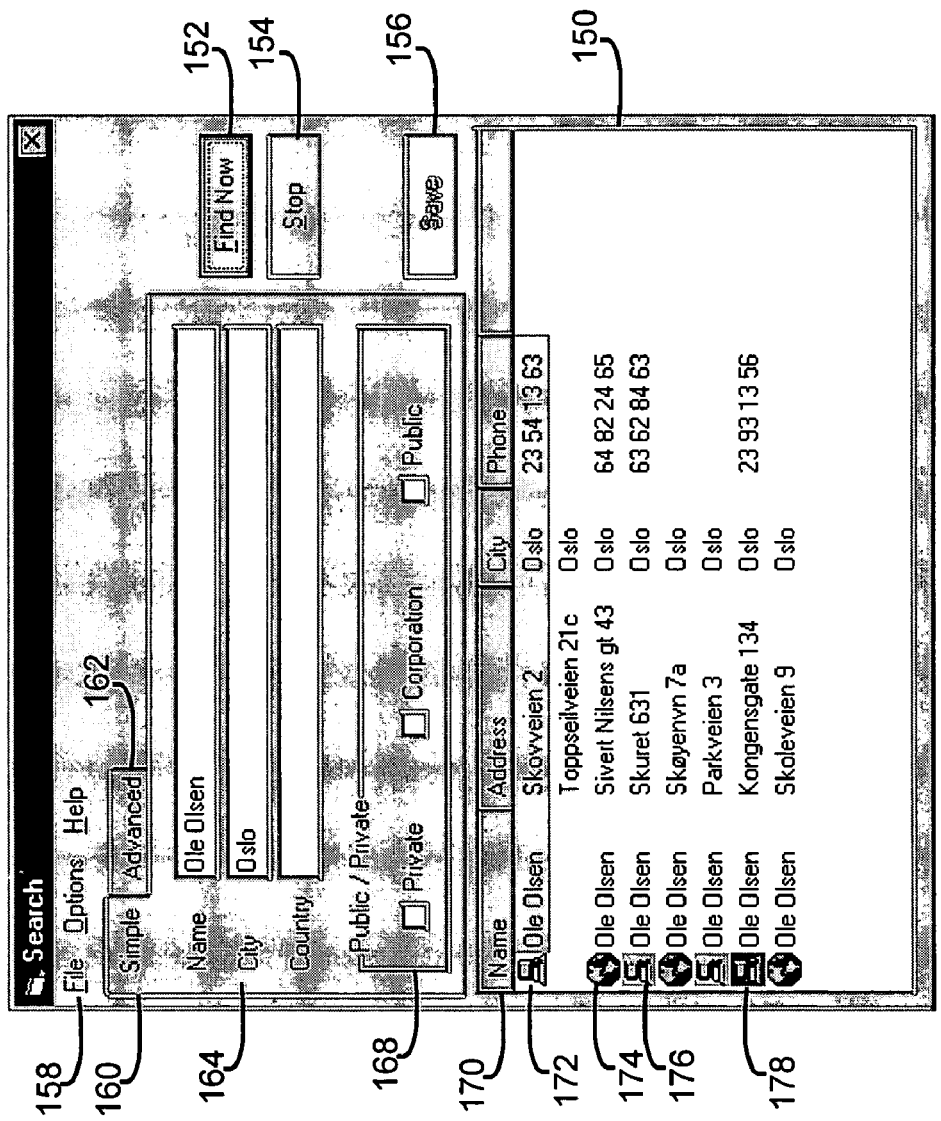
FIG. 18 is a screen shot illustrating an address handling program, according to an exemplary embodiment of the present invention.

FIG. 18 illustrates an exemplary search screen 150 generated by the single button addressing subprogram after it has been launched. In this example, a user ran a search (i.e., from the standalone single button addressing subprogram) against local data stored in, for example, Microsoft OUTLOOK™ and remote data stored in, for example, a remote web service.

In FIG. 18, the search screen 150 includes, for example, a Find Now button 152 for executing a search, a Stop button for stopping a search in progress and a Save button 156 for saving found data. The search screen 150 includes, for example, File, Option and Help menu selections 158, search criteria 164, including, for example, fields for inputting a Name, a City and/or Country, and Public/Private indicators 168, for indicating Private, Corporation and/or Public database searching options. The search results are displayed in a search window including Name, Address, City and Phone sort buttons 170, which sort the search results according to the button selected.

The search results are further marked with status indicators 172–178. Status indicator 172, for example, includes a computer icon with no color which indicates that the same data was found both locally and on the remote database (e.g., the Internet). Status indicator 174, for example, includes a globe icon which indicates that the same data was found on the remote database, but not on the local database. Status indicator 176, for example, includes a computer icon of a first color (e.g., yellow) which indicates that the same data was found on the local database, but not on the remote database. Status indicator 178, for example, includes a computer icon of a second color (e.g., red) which indicates that the data was originally added to the local database from the remote database, but now is no longer found on the remote database.

Figure 19:
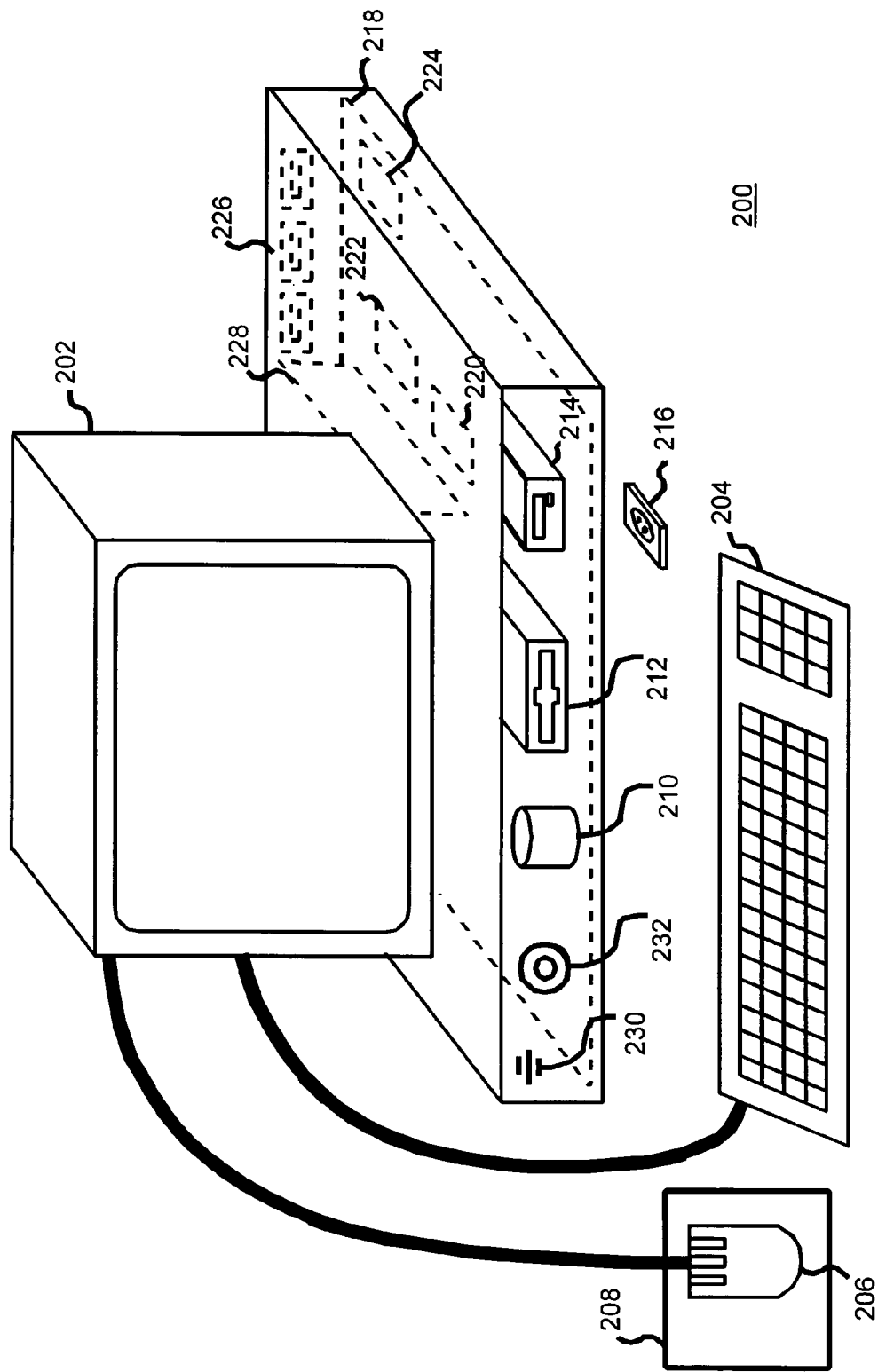
FIG. 19 is a schematic illustration of a general purpose computer for performing the processes of the present invention, according to an exemplary embodiment of the present invention.

FIG. 19 is a schematic illustration of a computer system for implementing the single button addressing according to the present invention. A computer 200 implements the method of the present invention, wherein the computer includes, for example, a display device 202, such as a conventional display device or a touch screen monitor with a touch-screen interface, etc., a keyboard 204, a pointing device 206, a mouse pad or digitizing pad 208, a hard disk 210, or other fixed, high density media drives, connected using an appropriate device bus (e.g., a SCSI bus, an Enhanced IDE bus, an Ultra DMA bus, a PCI bus, etc.), a floppy drive 212, a tape or CD ROM drive 214 with tape or CD media 216, or other removable media devices, such as magneto-optical media, etc., and a mother board 218. The mother board 218 includes, for example, a processor 220, a RAM 222, and a ROM 224 (e.g., DRAM, ROM, EPROM, EEPROM, SRAM, SDRAM, and Flash RAM, etc.), I/O ports 226 which may be used to couple to external devices, networks, etc., (not shown), and optional special purpose logic devices (e.g., ASICs) or configurable logic devices (e.g., GAL and re-programmable FPGA) 228 for performing specialized hardware/software functions, such as sound processing, image processing, signal processing, neural network processing, object character recognition (OCR) processing, etc., a microphone 230, and a speaker or speakers 232.

As stated above, the system includes at least one computer readable medium, or alternatively, the computer readable medium may be accessed through various paths, such as networks, internet, drives, etc. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 200 and for enabling the computer 200 to interact with a human user. Such software may include, but is not limited to, device drivers, operating systems and user applications, such as development tools. Such computer readable media further includes the computer program product of the present invention for performing any of the processes according to the present invention, described above (see, e.g., FIGS. 1–18). The computer code devices of the present invention can be any interpreted or executable code mechanism, including but not limited to scripts, interpreters, dynamic link libraries, Java classes, and complete executable programs, etc.

The invention may also be implemented by the preparation of application specific integrated circuits or by interconnecting an appropriate network of conventional component circuits, as will be readily apparent to those skilled in the art.

Address handling, according to this invention, is a significant simplification relative to existing methods, and requires little or no training on the part of a user, as correct addresses are retrieved with a minimal number of user commands, "clicks", keystrokes, etc. In addition, a program according to the present invention, can be programmed and created in most existing programming languages and be connected to most modern word processors. Therefore, according to the present invention, the process of creating and updating records in an address database is significantly simplified, since this may now be performed directly from the word processor.

Although the present invention is defined in terms of word processing documents, such as WORD™ documents and EXCEL™ spreadsheets, the present invention is applicable to all types of word processing documents, such as NOTEPAD™, WORDPAD™, WORDPERFECT™, QUATROPRO™, AMIPRO™, etc., as will be readily apparent to those skilled in the art.

Although the present invention is defined in terms of information management or database programs, such as OUTLOOK™, etc., the present invention is applicable to all types of information management or database programs, such as ACCESS™, ORACLE™, DBASE™, RBASE™, CARDFILE™, including "flat files," etc., as will be readily apparent to those skilled in the art.

Although the present invention is defined in terms of operating systems, such as WINDOWS™, MACINTOSH™, etc., the present invention is applicable to all types of operating systems, such as UNIX™, LINUX™, etc., as will be readily apparent to those skilled in the art.

Although the present invention is defined in terms of providing an input device, such as a button 42 in a word processor for address handling therein, the present invention may be practiced with all types of input devices, such as a touch screen, keyboard button, icon, menu, voice command device, etc., as will be readily apparent to those skilled in the art.

Although the present invention is defined in terms of a program retrieving information from a document before searching a database, the user may select the information in the document to be searched by the program in the database (e.g., by highlighting, selecting, italicizing, underlining, etc.), as will be readily apparent to those skilled in the art.

Although the present invention is defined in terms of a program retrieving a name or portion thereof from a document before searching a database, the program may retrieve an address or portion thereof from the document before searching the database and insert, correct, complete, etc., the retrieved address based on the information found in the database corresponding to the retrieved address or portion thereof, as will be readily apparent to those skilled in the art.

Although the present invention is defined in terms of an embodiment as described with respect to FIGS. 16–18, all of the relevant features as described with respect to FIGS. 1–15 apply to the embodiment as described with respect to FIGS. 16–18, as will be readily apparent to those skilled in the art. Similarly, although the present invention is defined in terms of an embodiment as described with respect to FIGS. 1–15, all of the relevant features as described with respect to FIGS. 16–18 apply to the embodiment as described with respect to FIGS. 1–15, as will be readily apparent to those skilled in the art.

Although the present invention is defined in terms of an address handling program provided in an operating system environment, such as WINDOWS™, MACINTOSH™, etc., of a personal computer, the program may run on an operating system environment, such as WINDOWS CE™, etc., of a client, such as cell phone, palm top device, personal organizer, etc., as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

This application claims priority and contains subject matter related to Norwegian patent application No. 984066 filed on Sep. 3, 1998, the entire contents of which are hereby incorporated by reference.

What is claimed as new and desired to be secured by Letters Patent of the United States is:

1. A computerized method for information handling, comprising:
   providing an input device configured to enter an execute command which initiates a record retrieval from local and remote information sources using a computer program;
   using said computer program to enter first information into search fields provided in said computer program;
   entering the execute command using the input device after the step of entering the first information;
   searching, using the computer program, directly the local and remote information sources for second information associated with the first information;
   comparing the second information retrieved from the local information source with second information retrieved from the remote information source; and
   displaying the second information from at least one of the local and remote information sources, when one of the local and remote information sources includes second information associated with the first information.

2. The method of claim 1, further comprising:
   storing the first information in the local information source if no second information associated with the first information is found in the local and remote information sources during said searching step.

3. The method of claim 1, further comprising:
   providing a user the option of making changes to the second information directly in the local information source.

4. The method of claim 3, wherein:
   the step of using said computer program comprises using said computer program to enter first information comprising at least one of a name, a title, an address, a telephone number, and an email address, or a part thereof, into said computer program; and
   the step of searching comprises searching, using the computer program, the local and remote information sources for second information comprising at least one of a name, a title, an address, a telephone number, and an email address, associated with the first information.

5. The method of claim 3, wherein:
   the step of providing an input device comprises providing one of a touch screen, a keyboard button, an icon, a menu and a voice command device, configured to enter an execute command which initiates a record retrieval from local and remote information sources using the computer program; and
   the step of displaying the second information comprises displaying the second information comprising one of displaying the second information and providing a voiced response of the second information.

6. The method of claim 3, wherein the step of providing an input device comprises:
   providing an input device configured to enter an execute command which initiates a record retrieval from local and remote information sources comprising at least one of a file, a database, a database program, a computer network, and a contact management program, using the computer program.

7. The method of claim 3, further comprising:
   storing the first information in the local information source if no second information associated with the first information is found in the local and remote information sources during said searching step; and
   wherein said displaying step, includes,
   marking the second information found in the local information source as consistent with the second information found in the remote information source, if second information associated with the first information is found in both the local and remote information sources,
   marking the second information found in the local information source as inconsistent with the second information found in the remote information source, if second information associated with the first information is found in only the local and information source, and
   displaying the marked second information.

8. The method of claim 1, wherein:
   the step of using said computer program comprises using said computer program to enter first information comprising at least one of a name, a title, an address, a telephone number, and an email address, or a part thereof, into said computer program; and
   the step of searching comprises searching, using the computer program, the local and remote information sources for second information comprising at least one of a name, a title, an address, a telephone number, and an email address, associated with the first information.

9. The method of claim 8, wherein:
   the step of providing an input device comprises providing one of a touch screen, a keyboard button, an icon, a menu and a voice command device, configured to enter an execute command which initiates a record retrieval from local and remote information sources using the computer program; and
   the step of displaying the second information comprises displaying the second information comprising one of displaying the second information and providing a voiced response of the second information.

10. The method of claim 8, wherein the step of providing an input device comprises:
    providing an input device configured to enter an execute command which initiates a record retrieval from local and remote information sources comprising at least one of a file, a database, a database program, a computer network, and a contact management program, using the computer program.

11. The method of claim 8, further comprising:
    storing the first information in the local information source if no second information associated with the first information is found in the local and remote information sources during said searching step; and wherein said displaying step, includes, marking the second information found in the local information source as consistent with the second information found in the remote information source, if second information associated with the first information is found in both the local and remote information sources, marking the second information found in the local information source as inconsistent with the second information found in the remote information source, if second information associated with the first information is found in only the local and information source, and displaying the marked second information.

12. The method of claim 8, further comprising:

providing a user the option of making changes to the second information directly in the local information source.

13. The method of claim 1, wherein:

the step of providing an input device comprises providing one of a touch screen, a keyboard button, an icon, a menu and a voice command device, configured to enter an execute command which initiates a record retrieval from local and remote information sources using the computer program; and the step of displaying the second information comprises displaying the second information comprising one of displaying the second information and providing a voiced response of the second information.

14. The method of claim 13, wherein the step of providing an input device comprises:

providing an input device configured to enter an execute command which initiates a record retrieval from local and remote information sources comprising at least one of a file, a database, a database program, a computer network, and a contact management program, using the computer program.

15. The method of claim 13, further comprising:

storing the first information in the local information source if no second information associated with the first information is found in the local and remote information sources during said searching step; and wherein said displaying step, includes, marking the second information found in the local information source as consistent with the second information found in the remote information source, if second information associated with the first information is found in both the local and remote information sources, marking the second information found in the local information source as inconsistent with the second information found in the remote information source, if second information associated with the first information is found in only the local and information source, and displaying the marked second information.

16. The method of claim 13, further comprising:

providing a user the option of making changes to the second information directly in the local information source.

17. The method of claim 13, wherein:

the step of using said computer program comprises using said computer program to enter first information comprising at least one of a name, a title, an address, a telephone number, and an email address, or a part thereof, into said computer program retrieval program; and the step of searching comprises searching, using the computer program, the local and remote information sources for second information comprising at least one of a name, a title, an address, a telephone number, and an email address, associated with the first information.

18. The method of claim 1, wherein the step of providing an input device comprises:

providing an input device configured to enter an execute command which initiates a record retrieval from local and remote information sources comprising at least one of a file, a database, a database program, a computer network, and a contact management program, using the record retrieval program.

19. The method of claim 18, further comprising:

storing the first information in the local information source if no second information associated with the first information is found in the local and remote information sources during said searching step; and wherein said displaying step, includes, marking the second information found in the local information source as consistent with the second information found in the remote information source, if second information associated with the first information is found in both the local and remote information sources, marking the second information found in the local information source as inconsistent with the second information found in the remote information source, if second information associated with the first information is found in only the local and information source, and displaying the marked second information.

20. The method of claim 18, further comprising:

providing a user the option of making changes to the second information directly in the local information source.

21. The method of claim 18, wherein:

the step of using said computer program comprises using said computer program to enter first information comprising at least one of a name, a title, an address, a telephone number, and an email address, or a part thereof, into said computer program; and the step of searching comprises searching, using the computer program, the local and remote information sources for second information comprising at least one of a name, a title, an address, a telephone number, and an email address, associated with the first information.

22. The method of claim 18, wherein:

the step of providing an input device comprises providing one of a touch screen, a keyboard button, an icon, a menu and a voice command device, configured to enter an execute command which initiates a record retrieval from local and remote information sources using the computer program; and the step of displaying the second information comprises displaying the second information comprising one of displaying the second information and providing a voiced response of the second information.

23. A computer system configured to perform the steps recited in any one of claims 18.

24. A storage medium storing a program for performing the steps recited in any one of claims 1–18.

25. A computerized method for information handling comprising:

providing an input device configured to enter an execute command which initiates a record retrieval from local and remote information sources using a computer program;

using said record retrieval program to enter first information into search fields provided in said computer program;

entering the execute command using the input device after the step of entering the first information;

searching, using the computer program, directly the local and remote information sources for second information associated with the first information;

displaying the second information from at least one of the local and remote information sources in said computer program, when one of the local and remote information sources includes second information associated with the first information;

storing the first information in the local information source if no second information associated with the first information is found in the local and remote information sources during said searching step; and wherein said displaying step, includes, marking the second information found in the local information source as consistent with the second information found in the remote information source, if second information associated with the first information is found in both the local and remote information sources and is consistent, marking the second information found in the local information source as inconsistent with the second information found in the remote information source, if second information associated with the first information is found in only the local and information source or if second information is found in both the local and remote information sources and is inconsistent, and displaying the marked second information.

26. A computer readable medium for information handling, the computer readable medium including program instructions for performing the steps of:

providing an input device configured to enter an execute command which initiates a record retrieval from local and remote information sources using a computer program;

using said computer program to enter first information into search fields provided in said computer program;

entering the execute command using the input device after the step of entering the first information;

searching, using the computer program, directly the local and remote information sources for second information associated with the first information;

comparing the second information retrieved from the local information source with second information retrieved from the remote information source; and displaying the second information from at least one of the local and remote information, when one of the local and remote information sources includes second information associated with the first information.

27. A computer readable medium for information handling, the computer readable medium including program instructions for performing the steps of:

providing an input device configured to enter an execute command which initiates a record retrieval from local and remote information sources using a computer program;

using said record retrieval program to enter first information into search fields provided in said computer program;

entering the execute command using the input device after the step of entering the first information;

searching, using the computer program, directly the local and remote information sources for second information associated with the first information;

displaying the second information from at least one of the local and remote information sources, when one of the local and remote information sources includes second information associated with the first information;

storing the first information in the local information source if no second information associated with the first information is found in the local and remote information sources during said searching step; and wherein said displaying step, includes, marking the second information found in the local information source as consistent with the second information found in the remote information source, if second information associated with the first information is found in both the local and remote information sources and is consistent, marking the second information found in the local information source as inconsistent with the second information found in the remote information source, if second information associated with the first information is found in only the local and information source or if second information is found in both the local and remote information sources and is inconsistent, and displaying the marked second information.

28. The method of claim 27, further comprising:

providing a user the option of making changes to the second information directly in the local information source.

29. The method of claim 27, wherein:

the step of using said computer program comprises using said computer program to enter first information comprising at least one of a name, a title, an address, a telephone number, and an email address, or a part thereof, into said computer program; and the step of searching comprises searching, using the computer program, the local and remote information sources for second information comprising at least one of a name, a title, an address, a telephone number, and an email address, associated with the first information.

30. The method of claim 27, wherein:

the step of providing an input device comprises providing one of a touch screen, a keyboard button, an icon, a menu and a voice command device, configured to enter an execute command which initiates a record retrieval from local and remote information sources using the computer program; and the step of displaying the second information comprises displaying the second information comprising one of displaying the second information and providing a voiced response of the second information.

31. The method of claim 27, wherein the step of providing an input device comprises:

providing an input device configured to enter an execute command which initiates a record retrieval from local and remote information sources comprising at least one of a file, a database, a database program, a computer network, and a contact management program, using the computer program record retrieval program.

32. A computerized method for information handling comprising:

providing an input device configured to enter an execute command which initiates a record retrieval from local and remote information sources using a computer program;

using said computer program to enter first information into search fields provided in said computer program;

entering the execute command using the input device after the step of entering the first information;

searching, using the computer program, directly the local and remote information sources for second information associated with the first information;

displaying the second information from at least one of the local and remote information sources in said computer program, when one of the local and remote information sources includes second information associated with the first information; and wherein said displaying step, includes, marking the second information found in the local information source as consistent with the second information found in the remote information source, if second information associated with the first information is found in both the local and remote information sources, marking the second information found in the local information source as inconsistent with the second information found in the remote information source, if second information associated with the first information is found in only the local information source, and displaying the marked second information.

33. A computer readable medium for information handling, the computer readable medium including program instructions for performing the steps of:

providing an input device configured to enter an execute command which initiates a record retrieval from local and remote information sources using a computer program;

using said computer program to enter first information into search fields provided in said computer program;

entering the execute command using the input device after the step of entering the first information;

searching, using the computer program, directly the local and remote information sources for second information associated with the first information;

displaying the second information from at least one of the local and remote information sources in said computer program, when one of the local and remote information sources includes second information associated with the first information; and wherein said displaying step, includes, marking the second information found in the local information source as consistent with the second information found in the remote information source, if second information associated with the first information is found in both the local and remote information sources, marking the second information found in the local information source as inconsistent with the second information found in the remote information source, if second information associated with the first information is found in only the local information source, and displaying the marked second information.

* * * * *